US008438053B2

(12) United States Patent
Chen

(10) Patent No.: US 8,438,053 B2
(45) Date of Patent: May 7, 2013

(54) ONE VIEW INTEGRATED PROJECT MANAGEMENT SYSTEM

(75) Inventor: Liang J. Chen, New York, NY (US)

(73) Assignee: 4 U Services, New York, NY (US)

( * ) Notice: Subject to any disclaimer, the term of this patent is extended or adjusted under 35 U.S.C. 154(b) by 0 days.

(21) Appl. No.: 13/470,285

(22) Filed: May 12, 2012

(65) Prior Publication Data

US 2012/0221367 A1    Aug. 30, 2012

Related U.S. Application Data

(62) Division of application No. 11/240,453, filed on Oct. 3, 2005, now Pat. No. 8,234,137.

(51) Int. Cl.
*G06Q 10/06* (2012.01)

(52) U.S. Cl.
USPC ........................................... 705/7.11

(58) Field of Classification Search .......... 705/7.11, 705/7.35
See application file for complete search history.

(56) References Cited

U.S. PATENT DOCUMENTS

| | | | |
|---|---|---|---|
| 6,308,164 B1 | 10/2001 | Nummelin et al. | |
| 6,714,915 B1 | 3/2004 | Barnard et al. | |
| 2002/0178036 A1 | 11/2002 | Murata et al. | |
| 2004/0030590 A1 | 2/2004 | Swan et al. | |

OTHER PUBLICATIONS

Han et al, A web-based integrated system for international project risk management, disclose decision-making processes in global projects—Mar. 2008.*

* cited by examiner

*Primary Examiner* — Andre Boyce
*Assistant Examiner* — Ernest A Jackson
(74) *Attorney, Agent, or Firm* — Lau & Associates

(57) ABSTRACT

Projects of any type require sophisticated management software programs. In reality, these management software programs are provided by various vendors and for different professional fields. For example, scheduling programs for construction professionals, blue print programs for drafting professionals, accounting programs for cost-control professionals. In addition, there are numerous other unofficial and official documents generated by managers of different levels for reporting or track-record-keeping purposes using popular word processing programs and spread-sheet programs. Documents generated by different software programs can only be viewed under the programs they are generated under or compatible programs. This poses a problem in that there is a lack of organized control resulting in difficulty in locating and viewing documents in a timely manner. The present invention provides an one view software program that would be able to provide an organized control and viewing of all documents regardless which software programs they are generated under.

10 Claims, 35 Drawing Sheets

ONE VIEW INTEGRATED PROJECT MANAGEMENT SYSTEM

This is a divisional application claiming priority on U.S. patent application Ser. No. 11/240,453 filed on Oct. 3, 2005, now allowed.

BACKGROUND OF THE INVENTION

Capital projects often require managers and operations personnel to make decisions based on numerous reports derived from various sources and software programs. Frequently, decisions for a project often depend on hundreds of undocumented spreadsheets and reports that, taken together, contain information critical to the control and success of the project. For example, each month or via other period increments, managers and operations personnel transfer data from or to spreadsheets they have either created individually or organizationally for their own administrative conveniences. Due to a lack of centralized organization and oversight, there arises inaccurate reporting, due to perhaps operator blunders, programming bugs, incompatibility of software, hardware failures, etc. The inaccurate reporting could ripple through linked spreadsheets, causing what otherwise might be an isolated reporting error to become a global reporting error. Therefore, key decisions might have been made by relying on erroneous or out-of-date information. To eliminate these problems, the present invention provides a single software package to perform information gathering and to prepare information presentation. The single software package is then able to provide a centralized organization and to assert administrative oversight.

SUMMARY OF THE INVENTION

It is a first object of the present invention to use a software program to display documents generated by another software program.

It is a second object of the present invention to integrally save all project related documents into a database.

It is a third object of the present invention to provide real time access of documents in a database.

It is a fourth object of the present invention to controllably display saved documents based on varying scales of user privilege.

It is a fifth object of the present invention to produce a progress report based on user defined cut-off dates.

It is a sixth object of the present invention to produce customized reports based on client requests.

Other objects of the present invention are disclosed in greater details in the specification of the present invention.

DETAIL DESCRIPTION OF THE INVENTION

Figure 1:
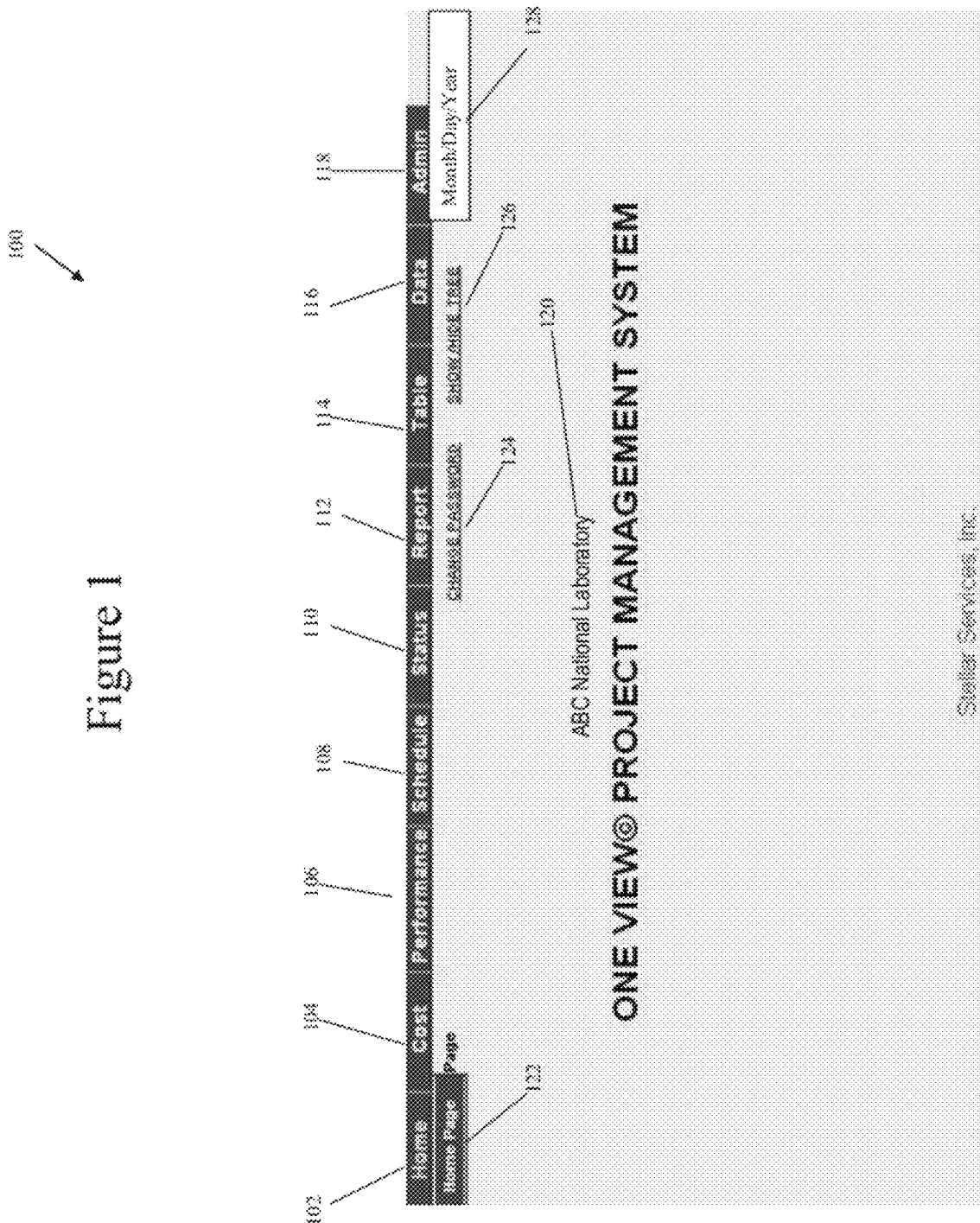
FIG. 1 shows an example of a screen-shot of an interface of numerous modules of the present invention.

The present invention is an informational and a reporting tool that bring together all the data needed to control large, medium and small capital projects alike. At any level of a project's work breakdown structure (WBS), the present invention provides comprehensive reports at any level of detail across either multiple projects, a single project, or a bid package. On-line reports regarding cost, schedule, contract, and project status offer advantages associated with real-time information access, which enable managers to easily identify on-going trends and take immediate action. The on-line capability also makes it possible to offer Web-based invoice submission from contractors and consultants. The on-line capability also enables on-line invoice checking.

The present invention was developed on a data mart architecture that captures and stores data from standard commercial software programs. They include, for example, Primavera Project Planner, Expedition, Prolog, Constructware, Cobra, SAP, JDEdwards, and client legacy systems, among others. Given the data mart architecture of the present invention, using the present invention does not require the elimination of existing software that user clients are already accustomed of using. Thus, investments made in existing software programs are protected. Because the present invention is able to retrieve either raw or processed data depending on specific applications, the use of the present invention does not require additional training for those user-clients whose daily duties only require the use of pre-existing software programs and do not need to directly enter any information into the present invention.

The present invention permits project managers and executives to review a project's progress, including data for planning, budgeting and controlling major aspects of the project throughout all phases. The present invention is able to perform such tasks as or assume such roles as:

Online Invoicing
Cost Management System
Scheduling/Project Progress
Staffing Plan/Timesheets
Document Management System
Security
Calendar Therefore, the present invention is first and foremost a Web-based application package running on various platforms. It does have certain prerequisites in order to run though different platforms. The minimum requirements for the network server include popular operating systems such as Windows 2000 Server, an Oracle database server, etc. A minimum requirement for workstations includes, for example, Windows OS 2000 or higher with Internet Explorer 4 or higher. Other requirements for workstations, for example, include having a network connection; installing Crystal Reports and a PDF reader such as an Adobe Acrobat Reader.

As somewhat mentioned above, the present invention can also integrate data from various applications to assist with the Project Manager's decision-making process. Various applications, for example, may include Oracle Financial, Expedition, P3e/c, SureTrack, Welcom COBRA, Primavera P3, SureTrack, Welcom COBRA, Microsoft SQL Server, Microsoft Access, SNC PMCS, and Primavera Project Planner, among others.

The present invention provides an automated Monthly Status Report to the requirement of a client's specifications. This would eliminate the tedious, error-prone requirement for manual data and text entry from multiple sources.

The benefits of the present invention are many folds. To elaborate more on those already mentioned and to introduce some that have not yet been mentioned, first, a project Web site of the present invention enables managers and other authorized personnel to have real-time access to information in tabular, graphic, or text form. These types of reporting conventionally required making a request to, for example, a scheduler, a cost engineer, a contract manager, an accountant, etc., because only these professionals would possess the skill sets necessary to run reports from commercial business applications such as project scheduling, accounting, engineering programs, etc. After making such type of requests from various professionals, a waiting period is required before gaining access of the reports. By the time managers and other authorized personnel obtain possession of the reports, these reports are already out-of-date. Managers and other personnel are in reality, left to make key decisions based on out-of-date information.

Second, data provided by the present invention are documented at every level tracing to the name of an originator, the date of reporting and the time the report was make. There is no guesswork as to the data's origin. Since data retrieved by the present invention are based on original reporting, there is no need to manually re-organize any of these data in preparation of the retrieval. More specifically, to make use of the most reliable information, the present invention maintains the original data constrains and algorithms of the original commercial software programs throughout the present invention. The elimination of the need to manually re-organize any information preserves information integrity and precludes any additional manual labor.

In the audit trail front, because the monthly Status Report is automated and derived from sound, documented data, a reliable current and historical audit trail is always available. Due to savings through automation, tremendous time and money are saved through eliminating report compilation, printing and storage. The automated process also provides early warning flags that would warn managers about potential problems.

Regarding benchmarks, earned value and estimate-at-completion calculations may be shown in tabular or graphic forms. These forms of presentation communicate an accurate, intuitive and a readily recognizable report.

Regarding advantages of customization, reports from the present invention would fit clients' needs rather than forcing clients to change their pre-existing business practices. Reports made can be of a comprehensive nature on any level of detail or type of data, such as cost, schedule, RFI's, submittals, procurement, drawing review, real-time project photos and maps, invoices, etc.

Regarding accessibility of key legal documents, the present invention can provide managers and other qualified personnel to obtain details and terms of such legal documents as contracts, procurement orders, change orders, claim statuses, etc. They can obtain this information irrespective of any geographical constraints as long as they are assessable to the Internet.

Regarding familiar data entry screens, the present invention is customized for ease of use by employees and managers at any level, because it conforms to the client's pre-existing business practices.

Regarding document control, the present invention provides features related to tracking, viewing, and audit trail for drawings and documents.

Regarding security, access of the present invention can be defined as role-based or user-based. All project data resides on an owner-manager network, not on a fee-based ASP.

Regarding a work breakdown structure, all related WBS data can be rolled up into one macro view of the project or viewed at any drill-down level of detail.

As with other software programs, numerous modules are put together based on the specific need of a project. The modules available in the present invention include, for example, home, cost, performance, schedule, status, report, table, data, administration, etc. An interface of these modules is shown by way of an example in FIG. 1. Reference 100 provides an overview of the modules. The interface can either be in a single frame or a plurality of dual frames depending on the project's needs. For dual frames, the left frame shows the project Work Breakdown Structure (WBS) tree. The WBS levels can either be shown or hidden by respectively expanding or collapsing the selected node on the menu tree. The right frame is for specific modules that show the requested report or table. The default view for the left frame shows the WBS code. To see the WBS description, click on the left mouse button. The frame on the left side of the screen is instrumental in deciding what report from which task to view. The right frame is divided into four parts. The top part shows, for example, the title and logo 120 of the project. The second part has the module menu, for example, Cost 104, Performance 106, Schedule 108, Status 110, Report 112, Table 114, Data 116, and Admin 118, spread across the row.

The third part shows four items that add functionality to the user. The first item tells the user its current location, for example, home page 122. The second allows the user to change the password 124. The third provides the user the opportunity to show or hide 126 of the tree frame for more visual space. Finally, the fourth item allows the user to choose the time period 128 to review.

The fourth part of the right frame is the actual body of the report or table the user wants to display. The purpose of the home module 102 is to act as an entry page, and also display the general information about the system. The cost module 104 provides different cost reports to the user, including, for example, BAC versus EAC, Funding Type, and MR and Contingency. Each entry in the BAC versus EAC table has been linked to a "Monthly Status Report," which gives the users an ability to check the desired detailed monthly status report.

The performance module 106 provides the tables to user to evaluate the performance of specific projects. Sub-menus have been implemented to further break down analysis of such items as performance value and variance. The variance performance table can be linked to specific monthly status reports for users to check the details of the project.

In the schedule module 108, different schedules, including, for example, Milestone, Critical Path, Current and Current v. Baseline schedule, can be displayed in .pdf format.

The status module 110 provides the user the status tables from different aspects, including RPA, Funding Log, Change Control Log, Milestone, and Monthly Status.

The report module 112 displays the executive report in Crystal Report format for users.

In the table module 114, numerous tables are used to provide users a large amount of useful information. Some of the tables such as WBS, Original BAC, Current BAC, Budget, MR and Contingency table, are designed to provide user friendly and dynamic interface, so that the user can show or hide the sublevels of the project WBS.

The data module 116 is another source for the user to get useful data and information for the project. Several data tables can be implemented under this module. Entries in various tables are linked to the detailed monthly status report.

The administration module 118 provides the system the role-based login. The administrators can use this module to do all kinds of management of the whole system, while the normal users cannot work on this module. Different categories of administration activities can be allowed in this module, including the following:

1. Miscellaneous—Allows the manager to do the normal kind of manipulation, such as creating new users, defining the project type and project identification, etc.
2. Data Transfer—Takes care of uploading the different file to the system.
3. WBS Builder—Builds new WBS into the system.
4. Milestone—Creates, modifies, or deletes the Milestone data for a specific project.
5. Original BAC—Creates or modifies original budget data for a specific project.
6. RPA—Creates, modifies, or deletes the RPA data for a specific project.
7. Funding Log—Creates, modifies, or deletes the Funding Log data for a specific project.
8. Change Control Log—Creates, modifies, or deletes the changer control log for a specific project.
9. Financial Crosswalk—Modifies the financial crosswalk data for a specific project.
10. Cost Center—Modifies the cost center table for the system.

To achieve the purpose of integrating cost, schedule, contract, current status and issue for a project management, and providing information on the internet/intranet, three major parts are included in the present invention. The first part is integration, which controls the functions of acquiring data. Depending on different applications used by the clients, the present invention performs analysis and stores useful data into an OneView data warehouse.

The second part is the web component. Through a secured OneView web portal, users can review most recent cutoff progress for their projects.

The final part is the customized reports. Based on the needs of the clients, various types of status reports can be generated from the OneView data warehouse.

I. Data Integration

Since clients can choose from a wide variety of applications to process their cost, schedule, and contract data, they can even use Microsoft Excel or other commercial spreadsheets. The present invention can analyze currently used database/spreadsheets, and store useful data into an OneView data warehouse by way of an example in FIG. 2.

Figure 2:
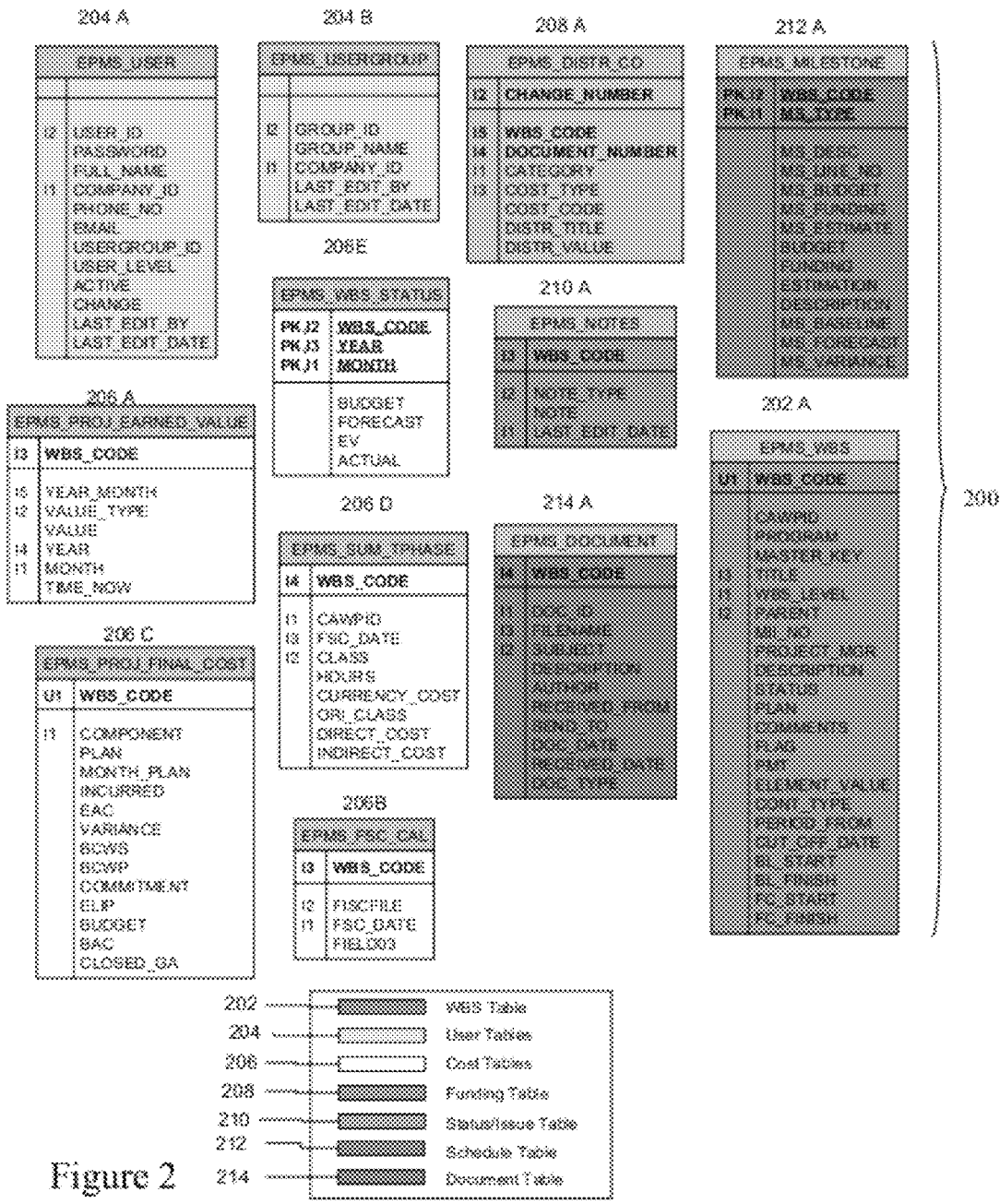
FIG. 2 shows an example of a data warehouse of the present invention.

Generally speaking, OneView data warehouse 200 of FIG. 2 includes seven major parts of data structure in different shades, WBS table, user tables, cost tables, schedule table, funding table, status/note table and document table. For various clients' requirements, the details of each table could be different, and some tables may be added or deleted for providing a more complex or simpler functionality.

WBS table 202A defines working breakdown structure (WBS) details, including WBS code, description, project manager, WBS level, and active/inactive/closed status.

User tables 204A and 204B are used for security purposes. The present invention defines user groups for different users. It is very flexible to assign each group to access their own projects and to their designated functions. The information stored here includes user logon ID, password, user level, and user groups, for example.

Cost tables 206A, 206B, 206C, 206D and 206E define cost detail information. The detailed time-phased dollar amounts, for example, are stored for budget, commitment, actual cost, earned value and forecast to the lowest level of WBS based on a pre-defined calendar. Some derived tables or views are going to be used for quick retrieving summarized level information purposes.

Funding table 208A includes, for example, project funding source and fund amount.

Status/Issue table 210A includes, for example, project status, weekly/monthly issue, and notes.

Schedule table 212A includes, for example, project milestone and activity description, baseline and forecast date.

Document table 214A includes, for example, document filename, subject, description, author, received from, sent to, document date, received date and document type.

In the real industrial world, a project is making progress every minute. Any "live data" from system in reality is still technically out-of-date. For a system to manage multiple projects, it is hard to update all the projects' statuses at the same time. This is the reason a cutoff date is needed to make it possible to provide a project status at a moment in time. Toward this end, the present invention captures all the information from various applications that are providing data for a pre-defined report cutoff date. After collecting the information, users can start preparing for the next cycle update. The present invention also backups all the historical data for every cutoff period, so as to make it possible to trace trends for the project.

Figure 3:
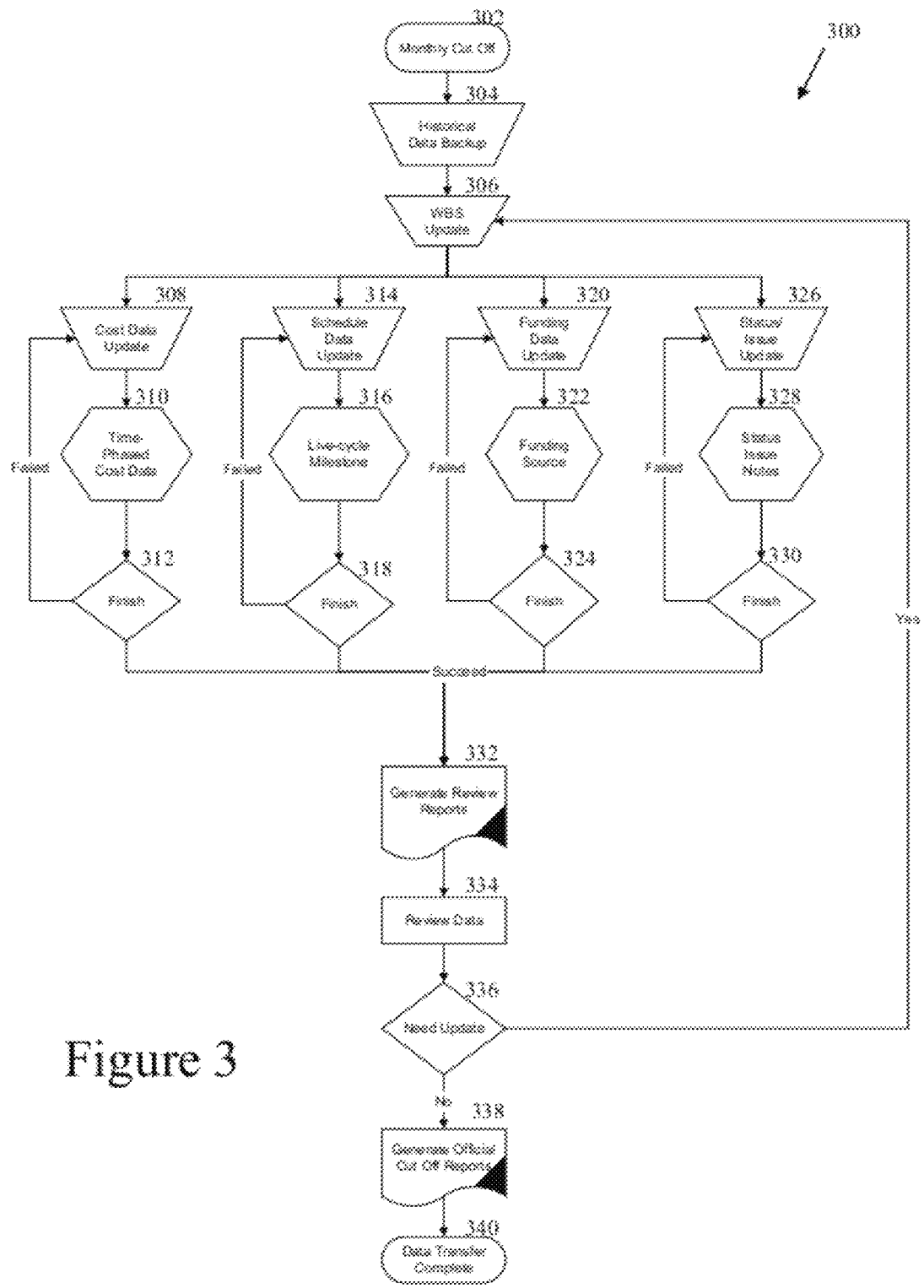
FIG. 3 shows an example of an overall process to store useful data into the data warehouse of the present invention.

FIG. 3, shows by way of an example, an overall process 300 to store useful data into the OneView data warehouse. At the very beginning of the process, a monthly cut off date 302 is established. Of course, a monthly cut off is chosen for illustration purposes only. Other cut off period may also be chosen depending on need, such as weekly, bi-weekly, quarterly, semi-annually, annually, among endless other possibilities.

Historical data backup is then performed at step 304. Following closely is performance of a WBS update 306. After all of these functions are performed, a set of more specific updates is performed. In this diagram, we have only listed four loops of updates; namely, cost data update 308 follow with time-phased cost data 310, schedule data update 314 follow with live-cycle milestone 316, funding data update 320 follow with funding source 322, status/issue update 326 follow with status issue notes 328. There may be other types of updates pertinent to the specific need of a project. The number of loops listed should not be regarded as restrictive. These four loops continuously perform their functions until all relevant type of data are updated.

A set of review reports 332 are generated at the end of all updates. The reports 332 are then reviewed for data accuracy at step 334. Should it be determined that further updates are needed, steps 306 to 336 are repeated. Otherwise, official cut off reports at step 338 are then generated and data transfer is completed at step 340. There are sub-steps being performed for each of the steps of historical data backup 304, WPS update 306, cost data update 308, schedule data update 314, funding data update 320 and status/issue update 326. Each of these sub-steps is designated with a separate diagram accompanied with explanations.

Figure 4:
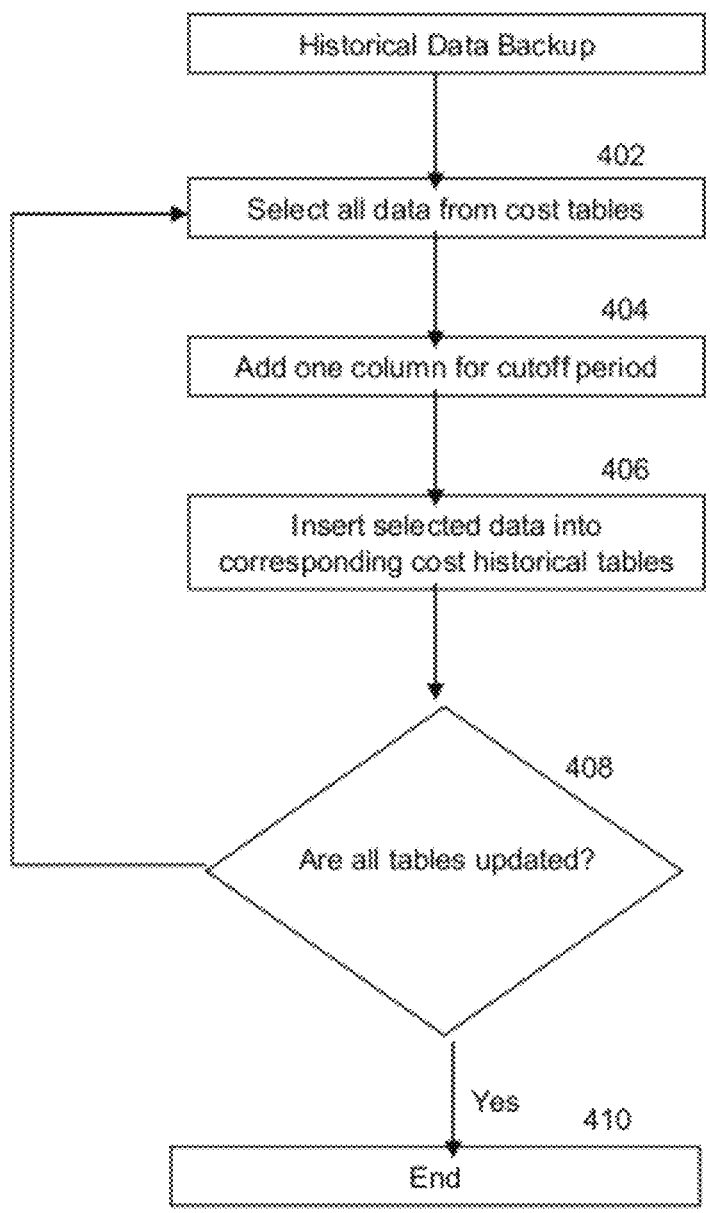
FIG. 4 shows an example of a process to conduct a historical data update of the present invention.

Details of historical data update at step 304 are shown by way of an example in FIG. 4. After initiating the historical data backup, a procedure of selecting all data from cost tables at step 402 is initiated. Following closely is adding one column for cutoff period at step 404. Thereafter, inserting selected data into corresponding cost historical tables 406. Steps 402 and 404 are repeated until the completion of the update of all the remaining schedule, funding and status/issue tables. The update is completed at step 410.

Figure 5:
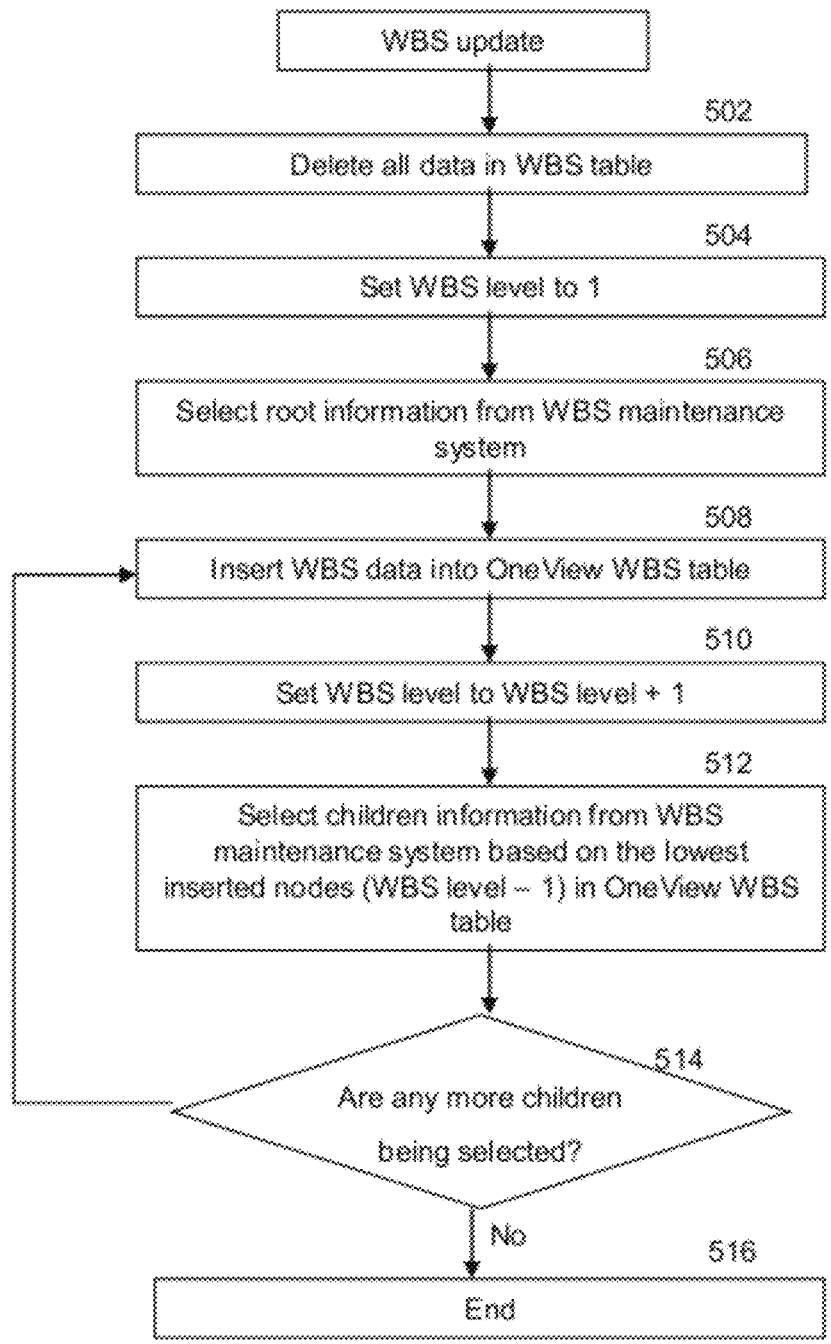
FIG. 5 shows an example of a process to conduct a work breakdown structure update of the present invention.

Details of WBS update at step 306 are shown by way of an example in FIG. 5. After initiating the WBS update, a process of deleting all data in WBS table at step 502 is initiated. Following closely is setting WBS level to 1 at step 504. Next is selecting root information from a WBS maintenance system at step 506. The WBS data is then inserted into OneView WBS table at step 508. WBS level is set to WBS level+1 at step 510. Children information are selected from WBS maintenance system based on the lowest inserted nodes (WBS level−1) in the OneView WBS table at step 512. If it is determined that more children information is being selected at step 514, then steps 508 to 512 are repeated. If it is determined that no more children information is being selected at step 514, the WBS update process terminates at step 516.

Figure 6:
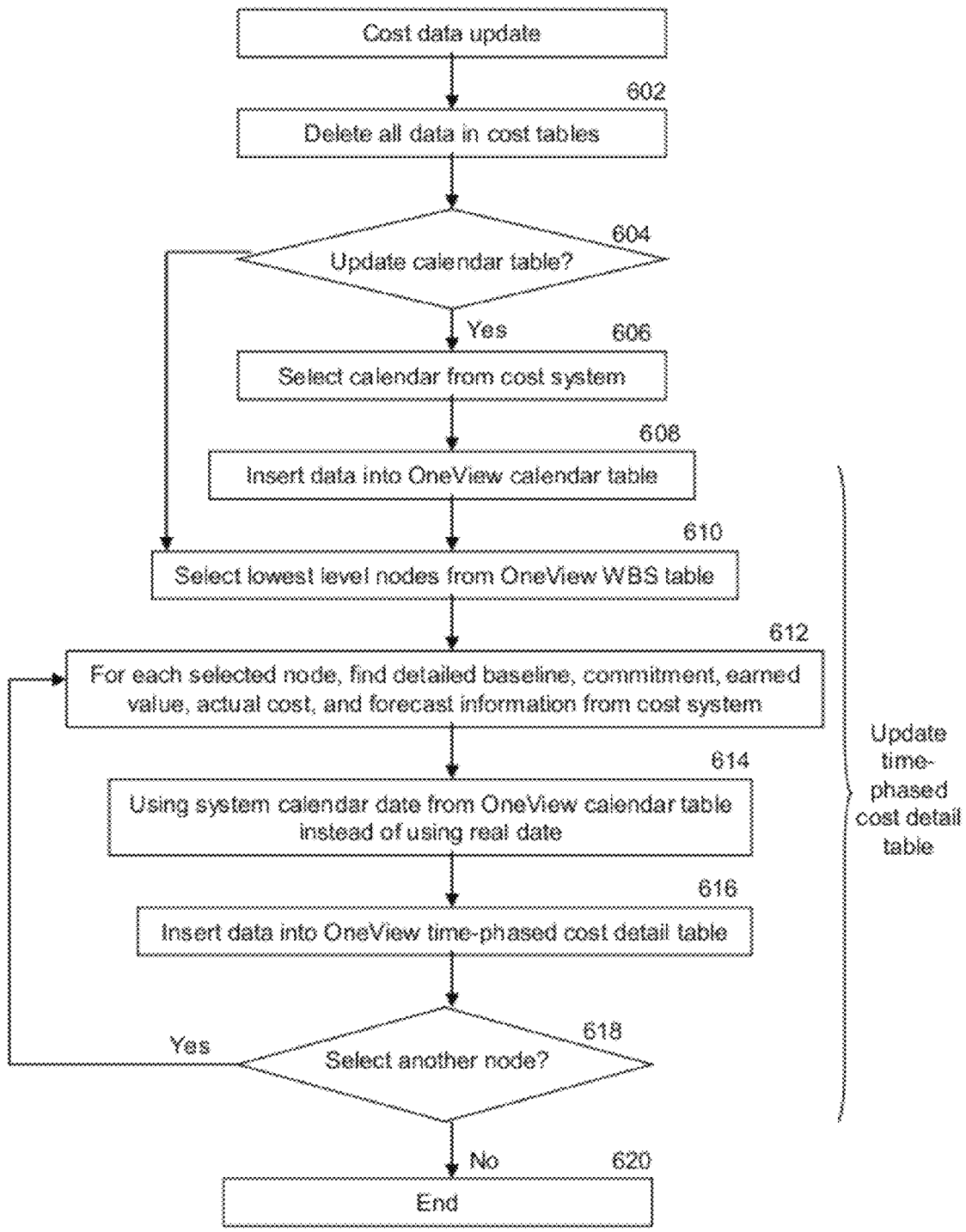
FIG. 6 shows an example of a process to conduct a cost data update of the present invention.

Details of cost data update 308 are shown by way of an example in FIG. 6. Initially, all data in cost tables are deleted at step 602. Following closely is a determination whether there is a need to update any available calendar table at step 604. If not, then steps 606 and 608 are skipped. Otherwise, a selection of a calendar from a cost system is made at step 606. Then data is inserted into an OneView calendar table at step 608. Thereafter, the time-phased cost detail table is updated by selecting lowest level nodes from the OneView WBS table at step 610. For each selected nodes, there is a need to find detailed baseline, commitment, earned value, actual cost and forecast information from the cost system at step 612. One should use the system calendar date from the OneView calendar table instead of using a real date as shown in step 614. Data is then inserted into the OneView time-phased cost detail table at step 616. At step 618, a determination is made regarding whether another node is selected. If yes, then steps 610 to 616 are repeated. Otherwise, the cost data update process is terminated at step 620 if it is determined that it is not necessary to update derived cost tables by using the OneView time-phased cost detail table.

Figure 7:
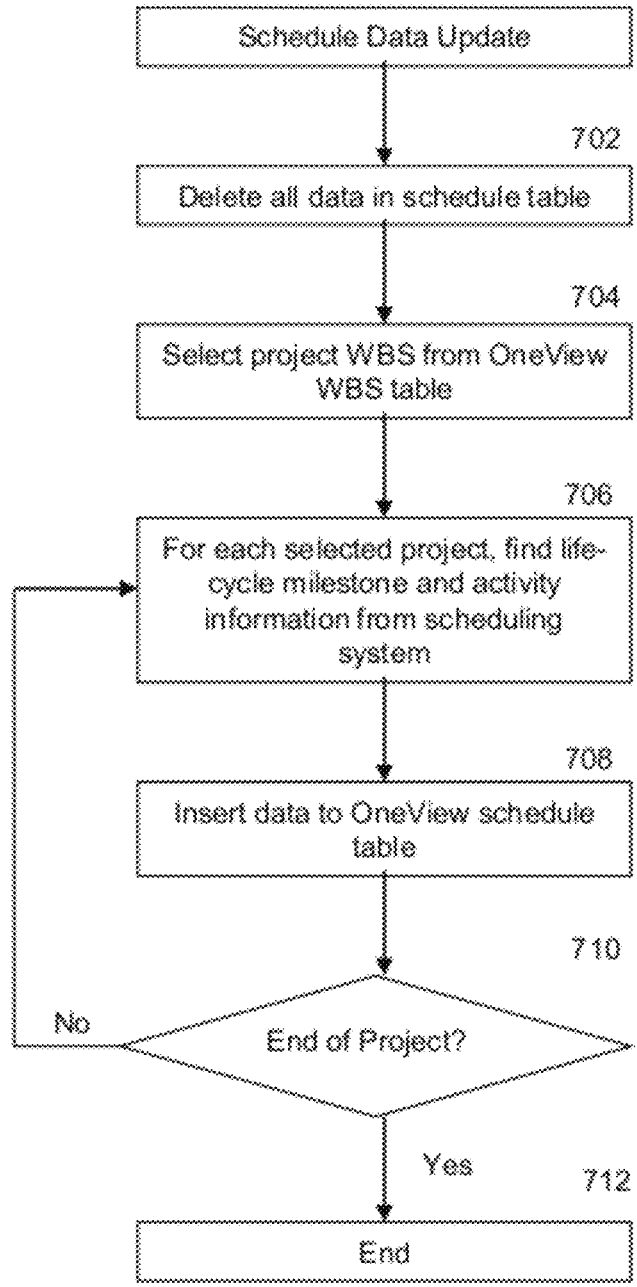
FIG. 7 shows an example of a process to conduct a scheduled data update of the present invention.

Details of schedule data update 314 are shown by way of an example in FIG. 7. This process begins by deleting all data in a schedule table as shown in step 702. Following closely is selecting a project WBS from OneView WBS table as shown in step 704. For each selected project, one should find the life-cycle milestone and activity information from the scheduling system in step 706. Data is then inserted into the OneView schedule table at step 708. There is a determination whether an end of a project is reached at step 710. If not, then steps 706 and 708 are repeated. The process terminates at step 712.

Figure 8:
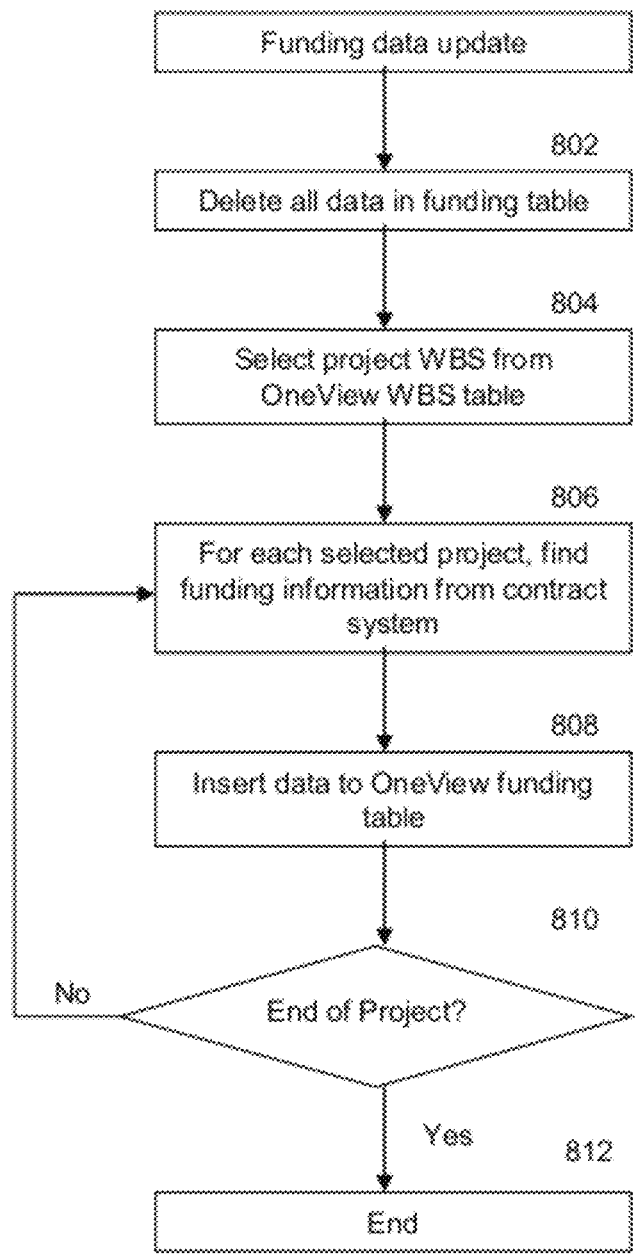
FIG. 8 shows an example of a process to conduct a funding data update of the present invention.

Details of funding data update 320 are shown by way of an example in FIG. 8. The process starts by deleting all data in the funding table at step 802. Next, a project WBS is selected from the OneView WBS table at step 804. For the selected project, there is a search of funding information from a contract system at step 806. Data is then inserted into an OneView funding table at step 808. There is a determination whether an end of a project is reached at step 810. If not, then steps 806 and 808 are repeated. The process ends at step 812.

Figure 9:
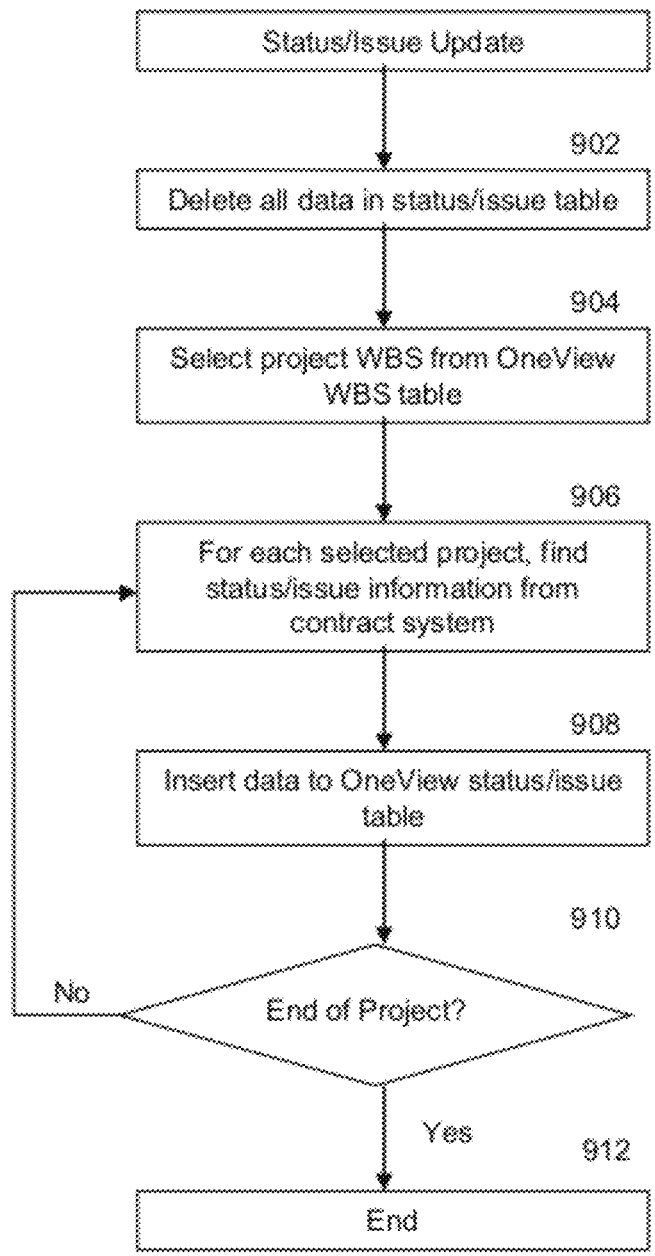
FIG. 9 shows an example of a process to conduct a status/issue update of the present invention.

Details of status/issue update 326 are shown by way of an example in FIG. 9. The process starts by deleting all data in the status/issue table at step 902. Next, a project WBS is selected from the OneView WBS table at step 904. For the selected project, there is a search of status/issue information from a contract system at step 906. Data is then inserted into an OneView status/issue table at step 908. There is a determination whether an end of a project is reached at step 910. If not, then steps 906 and 908 are repeated. The process ends at step 912.

II. OneView Web Portal

Figure 10:
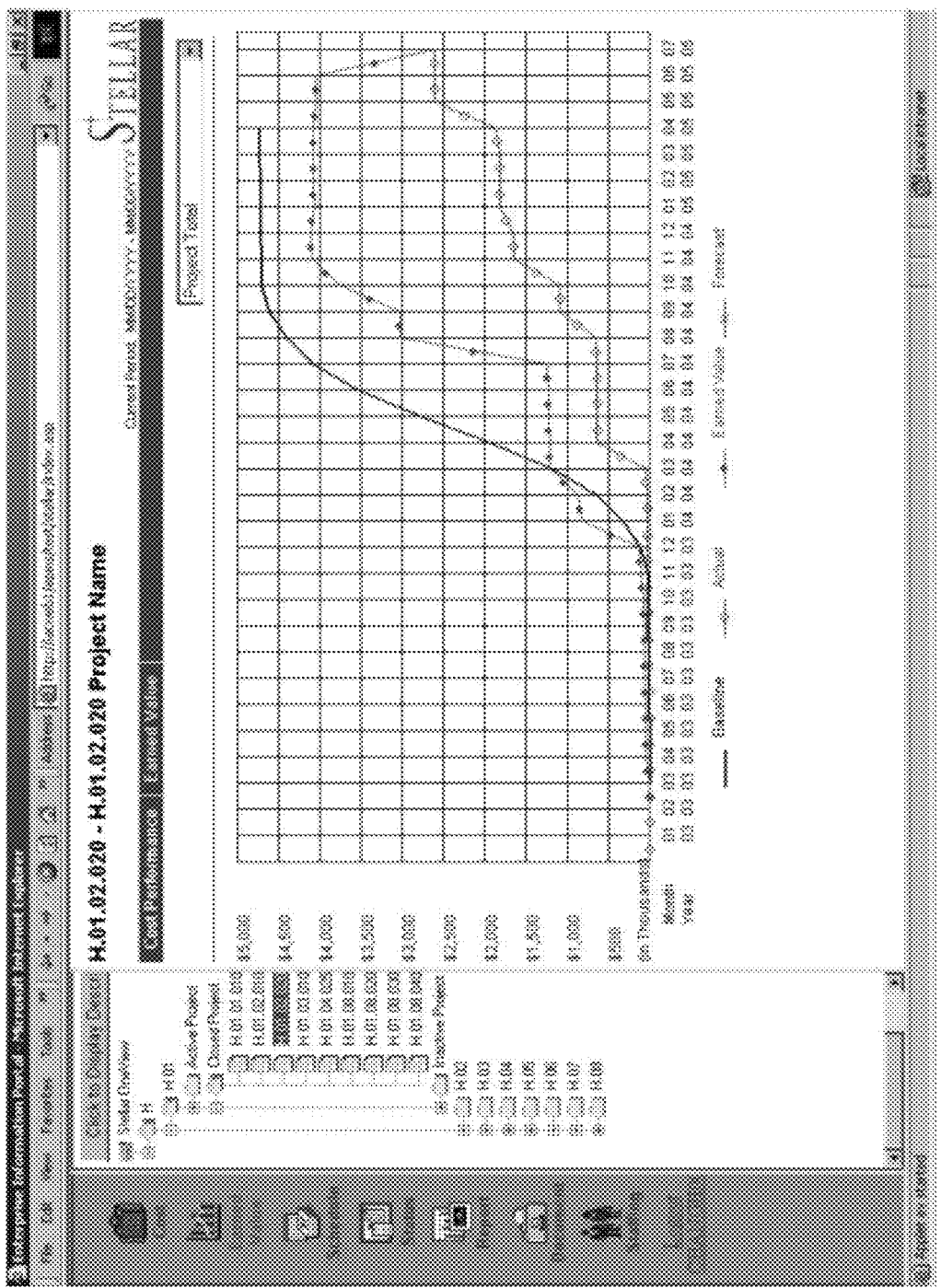
FIG. 10 shows an example of a screen-shot for a cost information of a hypothetical client on the present invention.

For different clients, the OneView web portal may be presented differently such as a company's logo, a toolbar location, and other functional requirements. An example of a screen shot for a hypothetical client on the OneView system is shown in FIG. 10.

Details of module flow in the OneView system needs to be defined. Specifically, there are three modules. They are a login module as shown by way of an example in FIG. 11, a main module as shown by way of an example in FIG. 12 and a reporting module as shown by way of an example in FIG. 13.

Figure 11:
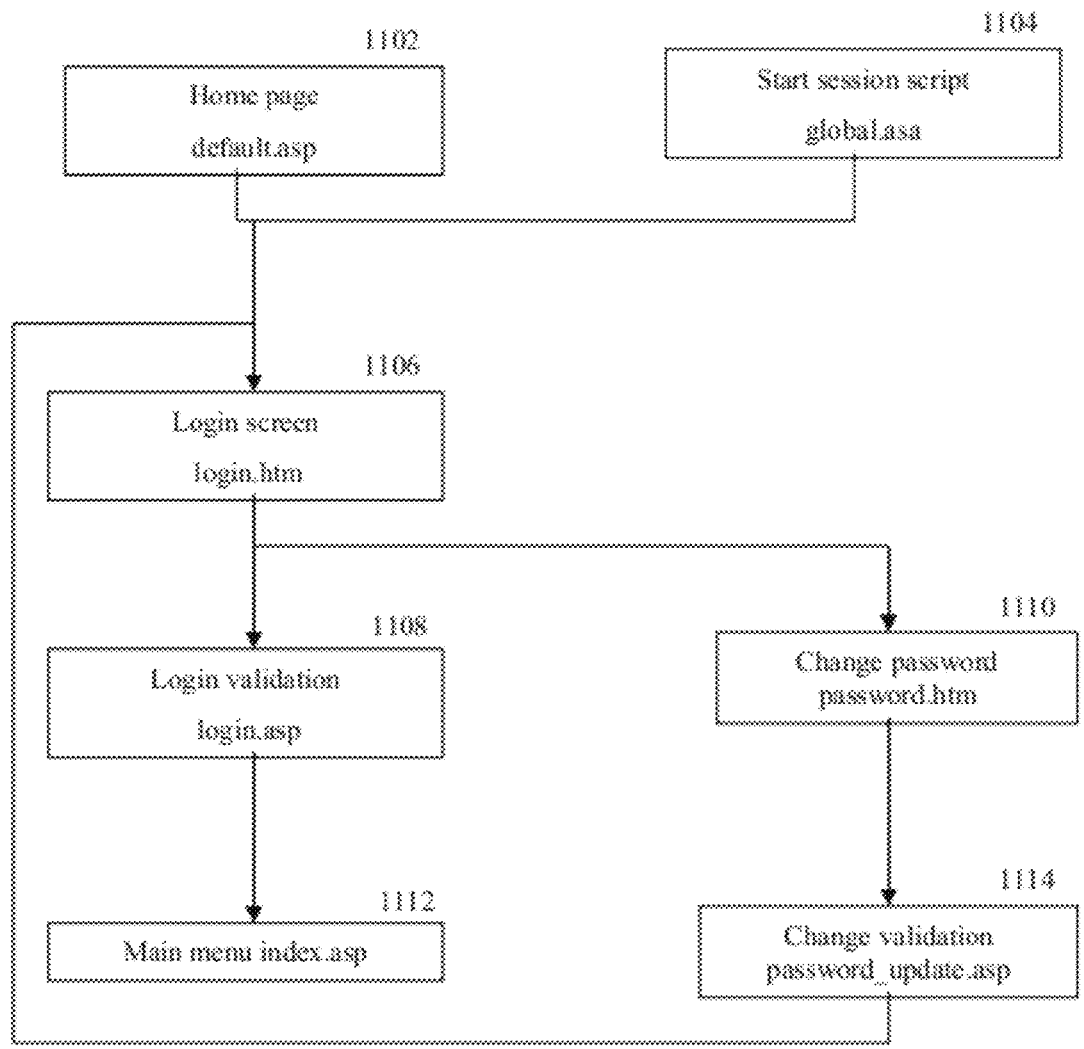
FIG. 11 shows an example of a chart of a login module of the present invention.
Figure 14:
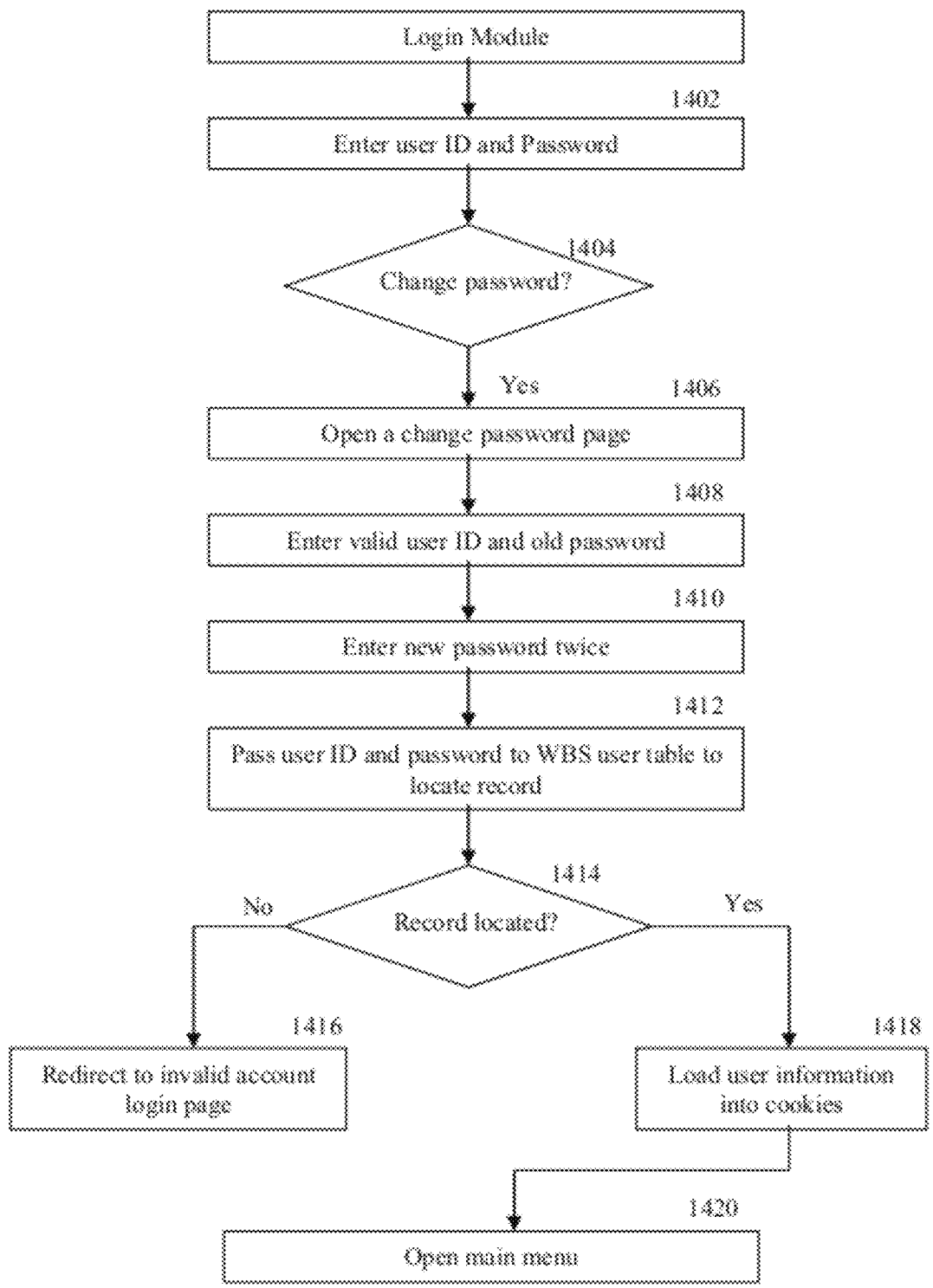
FIG. 14 shows an example of a flow chart of a login module of the present invention.

Regarding the login module as explained in conjunction with FIG. 11 and FIG. 14, since the OneView system is designed as a secured system, a user must have a valid account to enter the system. Specifically, the login page at step 1106 and at step 1402 allows a user to enter a user ID and a password. There is also provided a link to open change a password page at step 1110. A determination is made regarding whether the user wishes to change the password at step 1404. On the change password page at step 1110 and step 1406, a user has to enter a valid user ID and an old password at step 1408, and repeatedly enter a new password twice at step 1410. When the user successfully entered all information, the user ID and password are forwarded to a WBS user table at step 1412 to determine whether there is a record at step 1414. If no record related to the user ID and password is found, a screen is redirect to an invalid account login page at step 1416. If a record is found to validate the user ID and password at step 1418, then user information is loaded into cookie and a main menu is open at step 1420.

Figure 12:
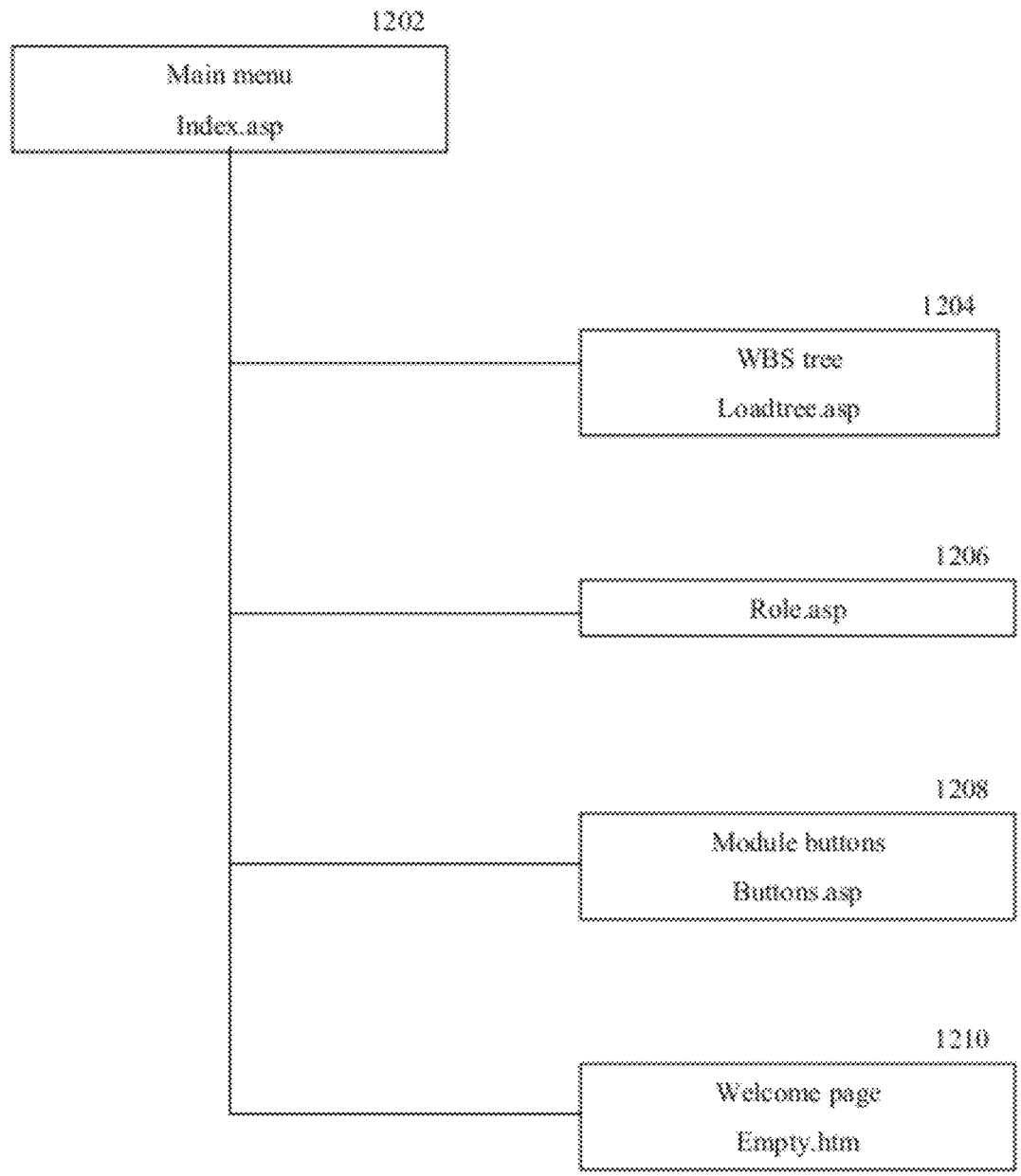
FIG. 12 shows an example of a chart of a main menu of the present invention.
Figure 15:
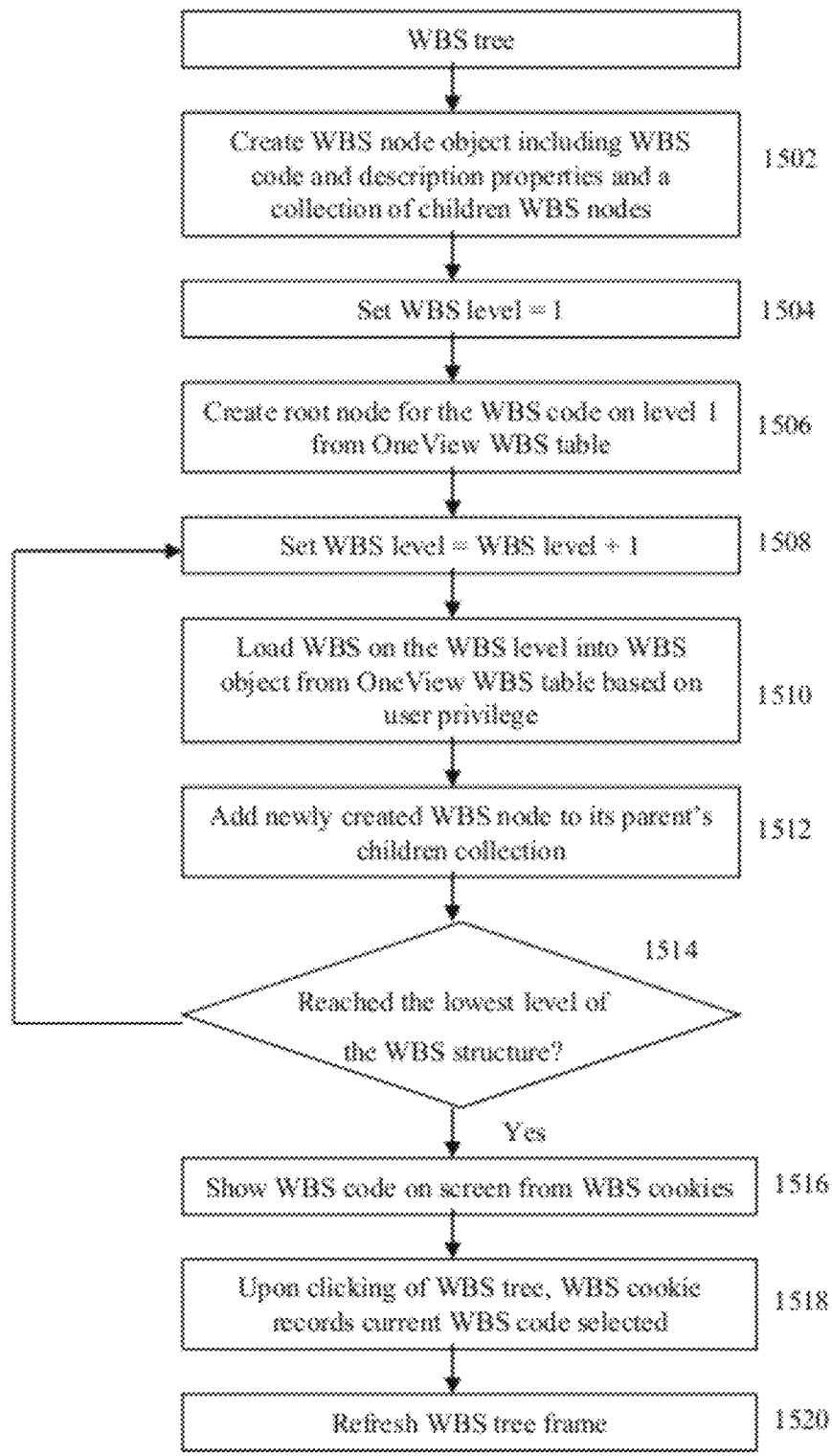
FIG. 15 shows an example of a flow chart of a work breakdown structure tree of the present invention.
Figure 16:
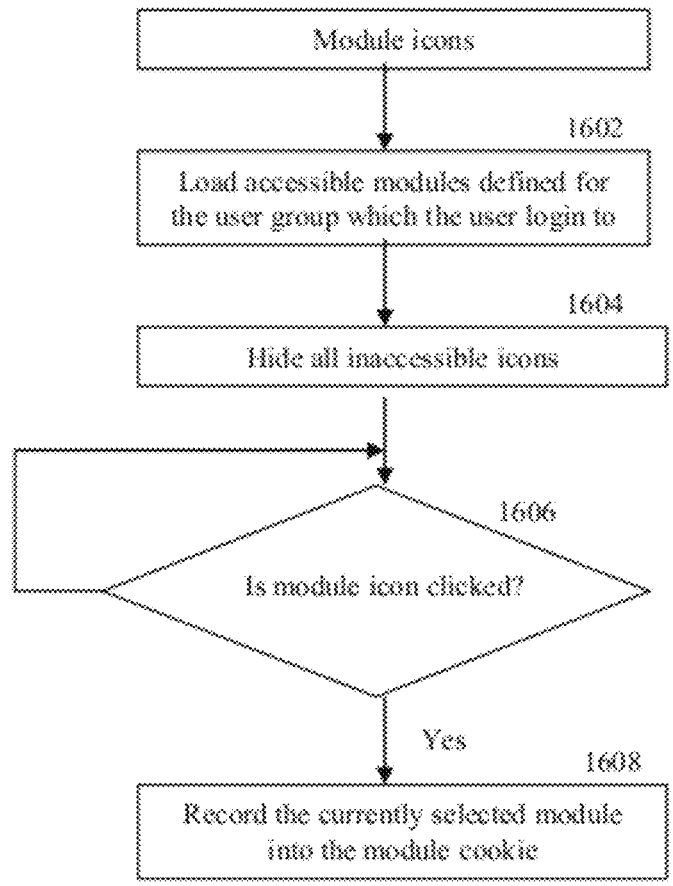
FIG. 16 shows an example of a flow chart of a module icon of the present invention.
Figure 17:
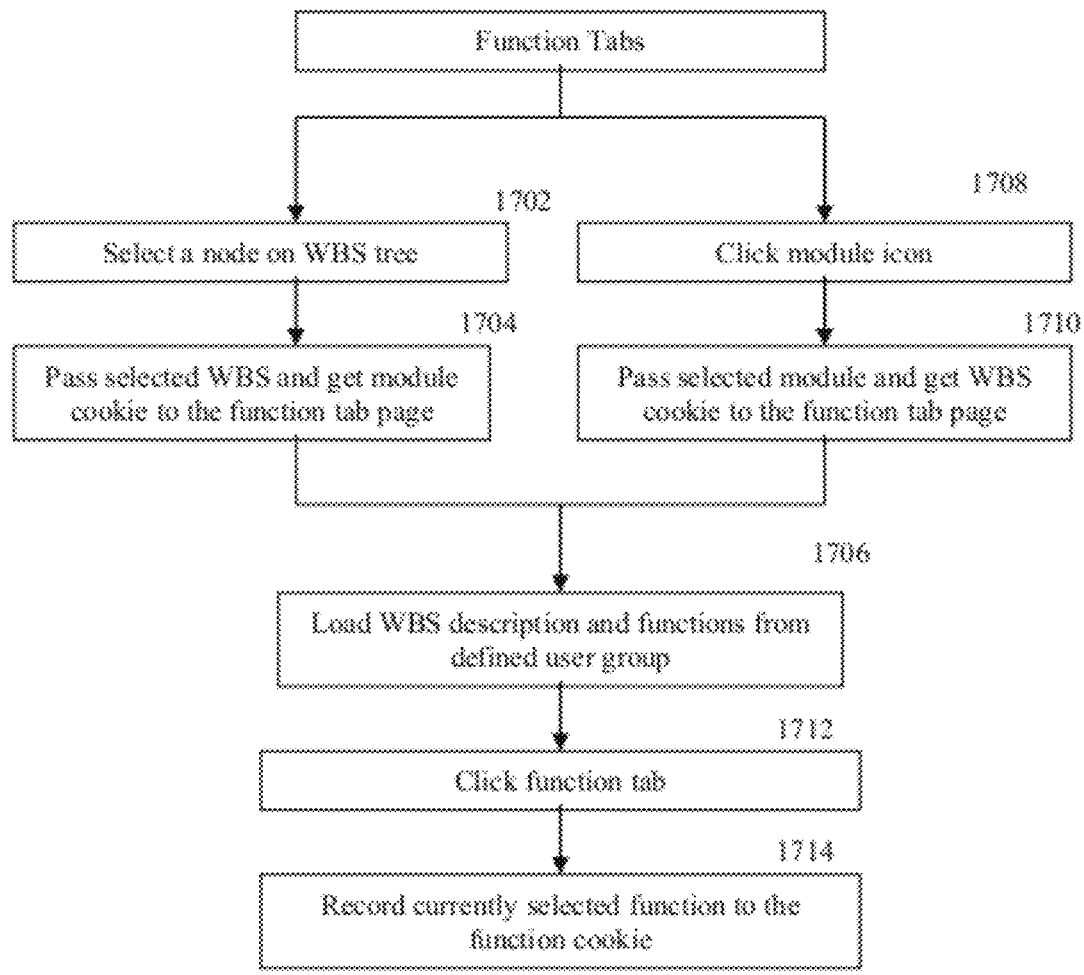
FIG. 17 shows an example of a flow chart of function tabs of the present invention.
Figure 18:
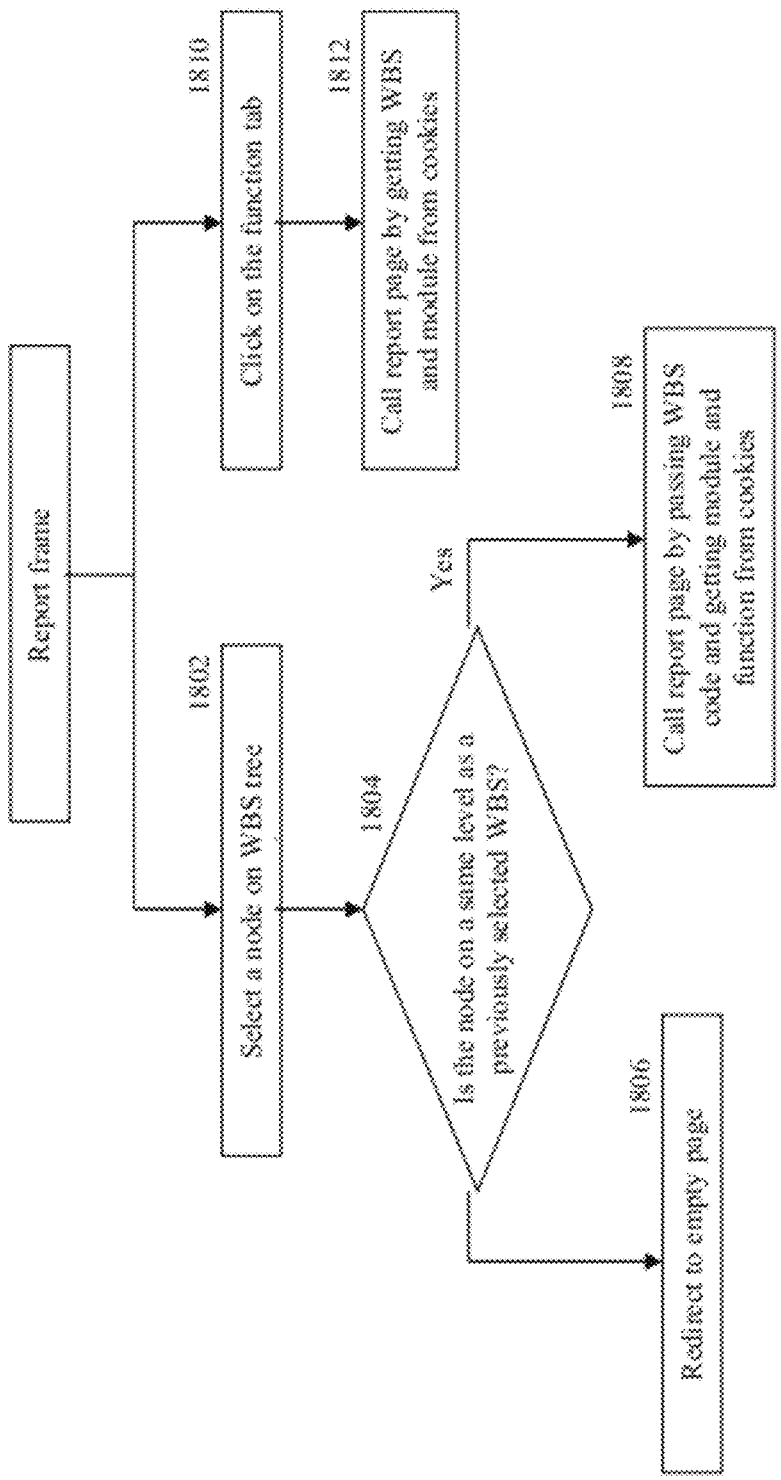
FIG. 18 shows an example of a flow chart of a report frame of the present invention.

Regarding the main menu of FIG. 12, there are four frames on the OneView web portal screen, including WBS tree as shown in FIG. 15, module icons as shown in FIG. 16, function tabs as shown in FIG. 17, and report frame as shown in FIG. 18. After user login, data for WBS tree and module icons will be loaded only once. And a welcome page will show on the report frame. To load the WBS tree, create a WBS node object including WBS code and description properties and a collection for children WBS nodes at step 1502. Then set WBS level=1 at step 1504. Thereafter, create a root node for the WBS code on level 1 from the OneView WBS table at step 1506. Now, set WBS level=WBS level+1 at step 1508. Next load WBS on the WBS level into the WBS object from the OneView WBS table based on user privilege at step 1510. Add newly created WBS node in step 1510 to the corresponding (WBS level−1) node's children collection. A determination is then made regarding whether it has reached the lowest level of the WBS structure at step 1514. If no, then repeat steps 1508 to 1512. If yes, then proceed to show it on the screen if the WBS code is in the cookies at step 1516. When the WBS tree is clicked, the WBS cookie will record the current WBS code selected at step 1518. The WBS tree frame will be refreshed at step 1520.

In FIG. 16, to load module icons frames, load accessible modules defined for the user group that the user has logged into at step 1602. Next, hide all inaccessible icons at step 1604. When a module icon is clicked at step 1606, the module cookie will record current information about the selected module at step 1608.

Figure 13:
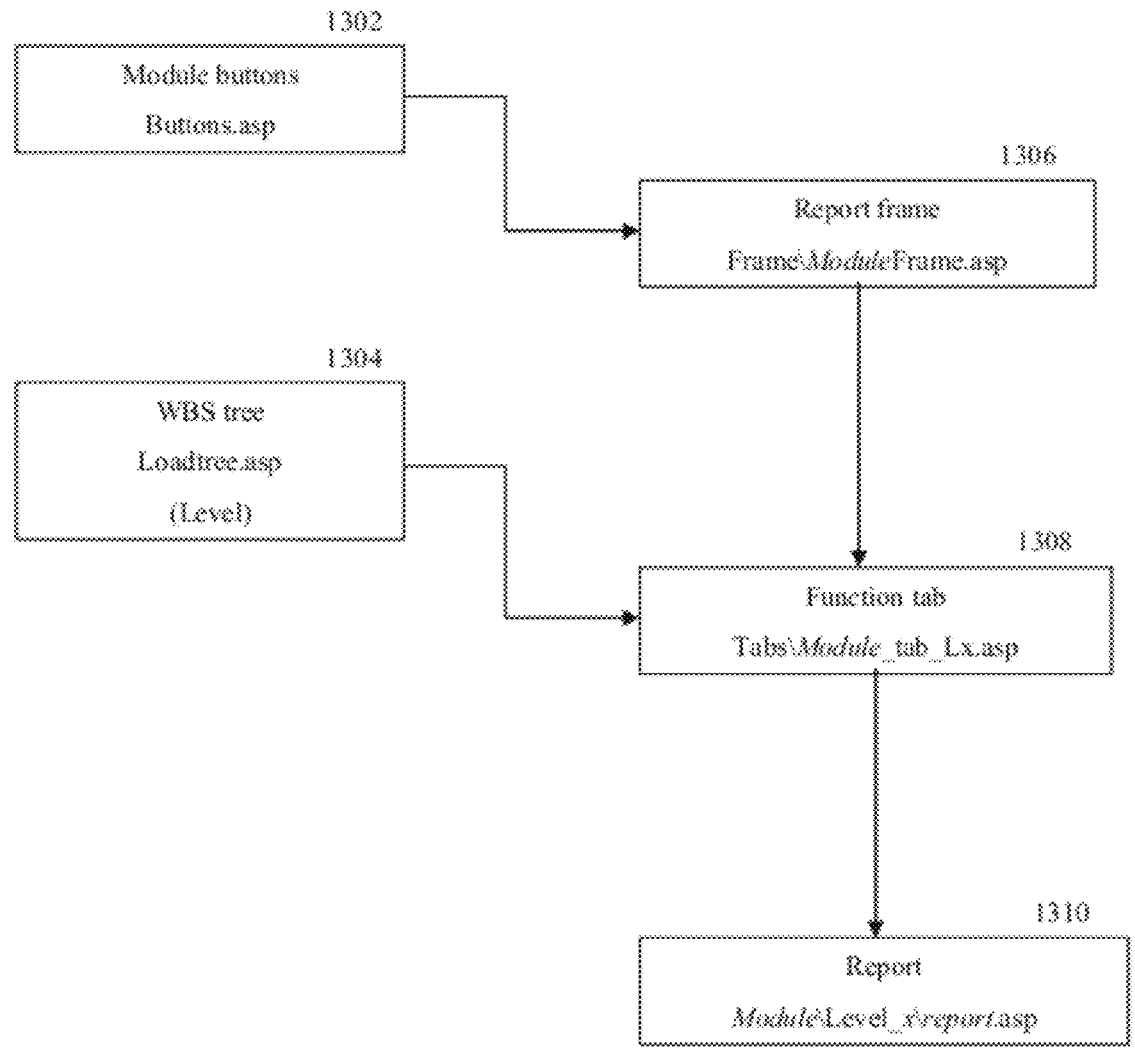
FIG. 13 shows an example of a chart of a reporting module of the present invention.

Regarding the reporting module of FIG. 13, the reporting module is a dynamic module in the OneView system. The function tab page 1308 will be loaded depending on the selected WBS level and module, and the report frame 1306 will be shown depending on the function that has been selected.

Pertaining to the function tabs of FIG. 17, the function tab is driven by selecting a WBS tree level and a module icon, and varies based on the user privilege. After selecting a node on the WBS tree at step 1702, pass the selected WBS and get module cookie to the function tab page at step 1704. Next load WBS description and functions from a defined user group at step 1706. When a module Icon is clicked at step 1708, the process passes the selected module and gets WBS cookie to the function tab page at step 1710. Thereafter, load WBS description and functions from a defined user group at step 1706. When a function tab clicked at step 1712, the function cookie will record the currently selected function at step 1714.

Pertaining to the report frame of FIG. 18, the report page is driven by clicking a function tab or a WBS tree. After selecting a node on the WBS tree at step 1802, a determination is made with regard to whether the node is on a same level as a previously selected WBS at step 1804. If it is not on the same level as the previously selected WBS, then redirect to an empty page at step 1806. If it is on the same level as the previously selected WBS, then call a report page by passing the WBS code and getting a module and a function from cookies at step 1808. One can click on the function tab at step 1810 then call the report page by getting the WBS and the module from cookies at step 1812. Just like customized reporting, each report page has its own algorithm to present different data.

Figure 19:
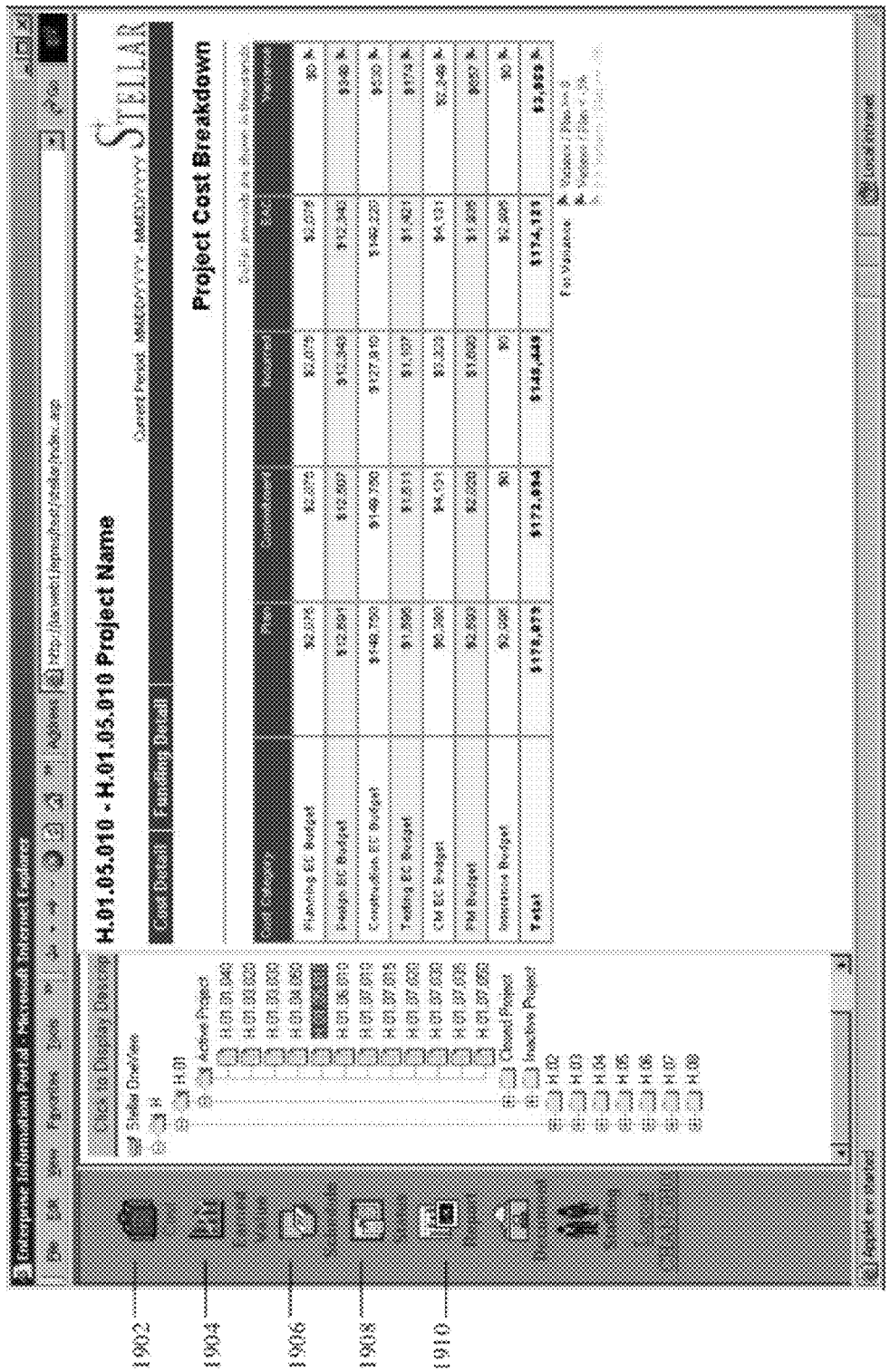
FIG. 19 shows an example of a portal page for a cost detail page for a hypothetical client of the present invention.
Figure 20:
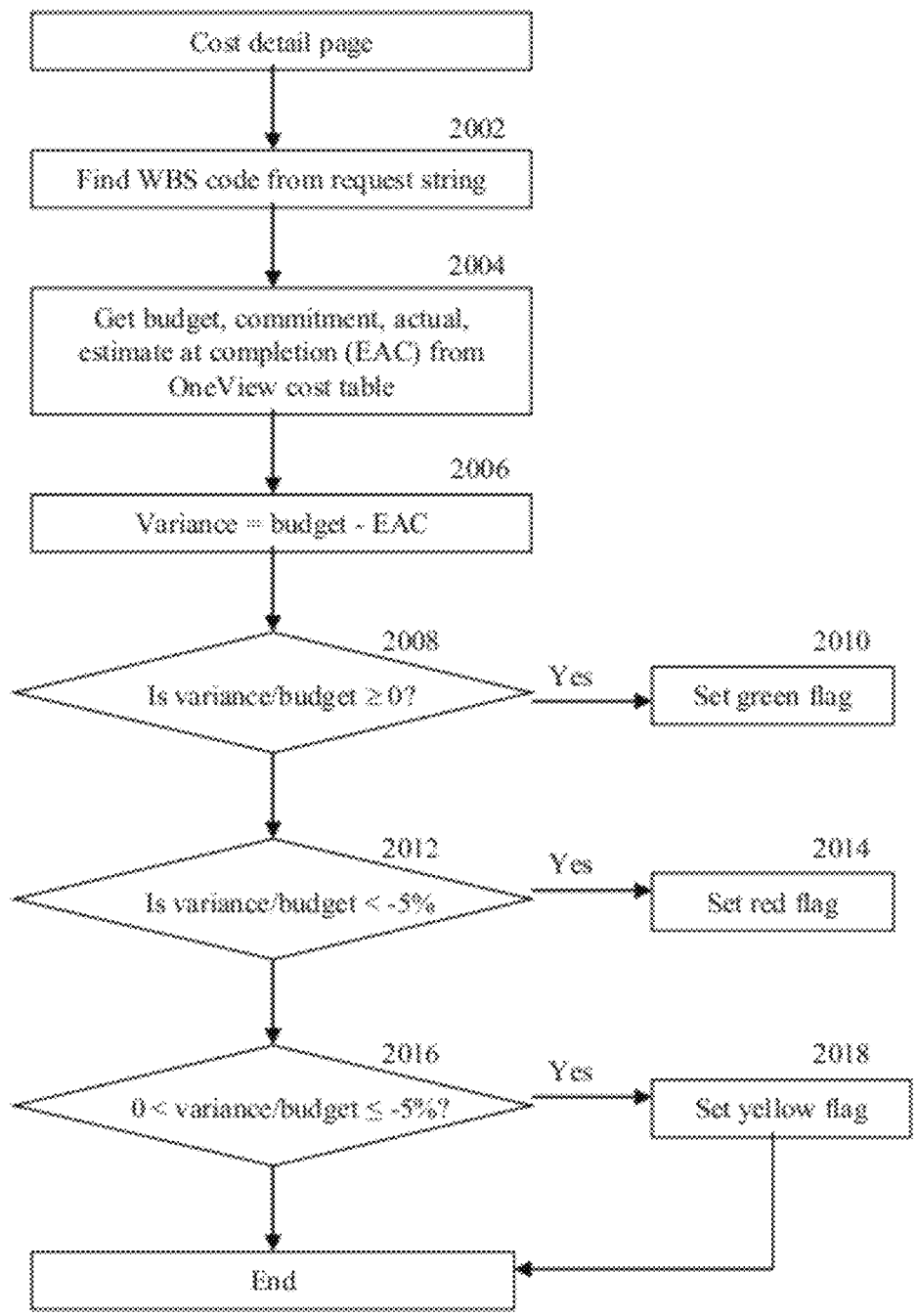
FIG. 20 shows an example of a flow chart for a cost detail page for a hypothetical client of the present invention.

On the OneView web Portal Pages, although layout of the pages are different from client's requirements, there are six basic major pages, including but not limited to cost details, earned value chart, funding source, milestone details, status and project general information. A sample portal page for a cost detail page is shown by way of an example in FIG. 19. On this page, there are shown a cost icon 1902, an earned value icon 1904, a schedule icon 1906, a status icon 1908 and a report icon 1910, among others. When any of these icons are clicked, corresponding information appears on the screen. In FIG. 19, it should be noted that the cost icon 1902 is clicked. As expected, in this example, all the cost details including budget, plan commitment, incurred EAC, and variance are shown. The process to load the cost detail page is shown in FIG. 20. It starts with finding a WBS code from a request string at step 2002. Follow with getting a budget, a commitment and an actual estimate at completion (EAC) from the OneView cost table at step 2004. Define the variance to be budget subtract EAC at step 2006. If it is determined that the ratio of variance over budget is greater or equal to 0 at step 2008, then set a green flag at step 2010. Otherwise proceed to determine whether a ratio of variance over budget is less than −5% at step 2012. If yes, then set a red flag at step 2014. If no, then proceed to determine whether a ratio of variance over budget is greater than 0 but less than or equal to −5% at step 2016. If yes, then set a yellow flag at step 2018 before ending the process at step 2020.

Figure 21:
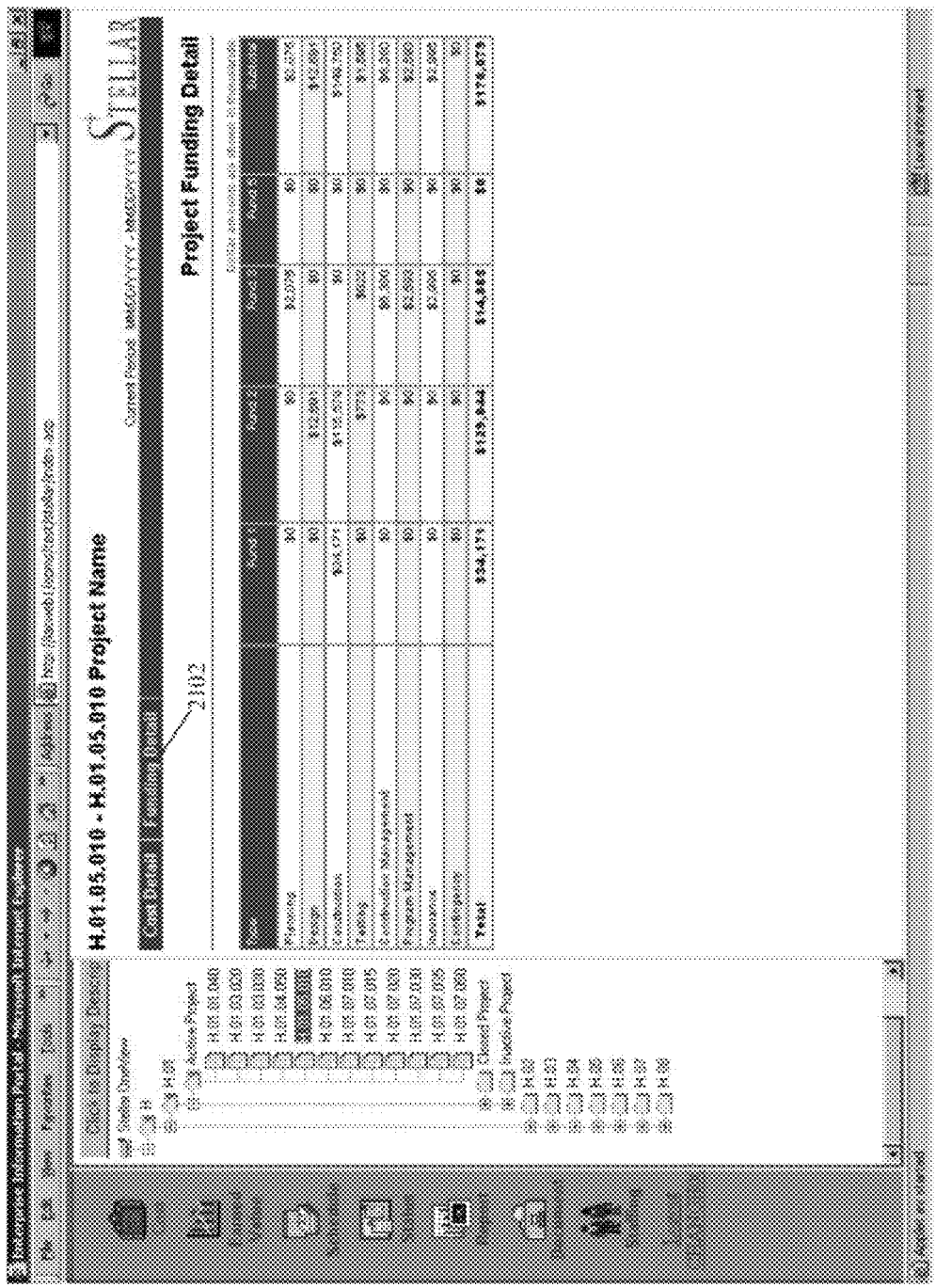
FIG. 21 shows an example of a screen-shot displaying funding details for a hypothetical client of the present invention.
Figure 22:
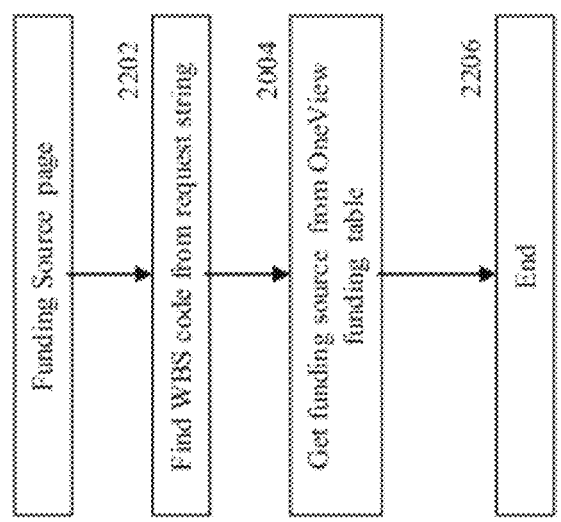
FIG. 22 shows an example of a flow chart of a funding source page of the present invention.

Under the cost icon 1902, one can also acquire information about funding source with a funding detail 2102 as shown by way of an example in FIG. 21. The process of loading a funding source page is shown by way of an example in FIG. 22. The process starts by finding a WBS code from a request string at step 2202. Then get funding sources from OneView funding table at step 2204 before ending the process at step 2206.

Figure 23:
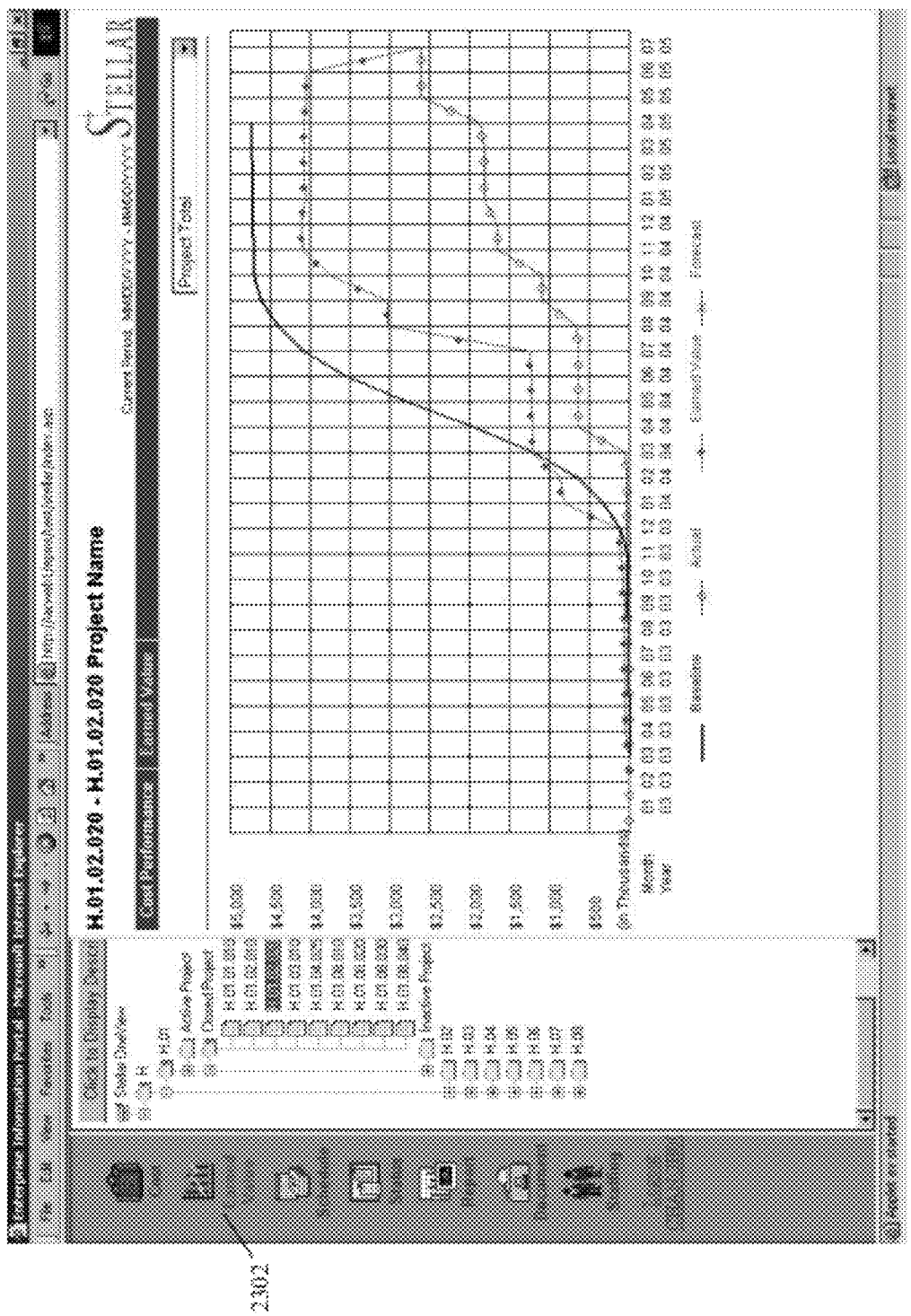
FIG. 23 shows an example of a screen-shot displaying earned values for a hypothetical client of the present invention.
Figure 24:
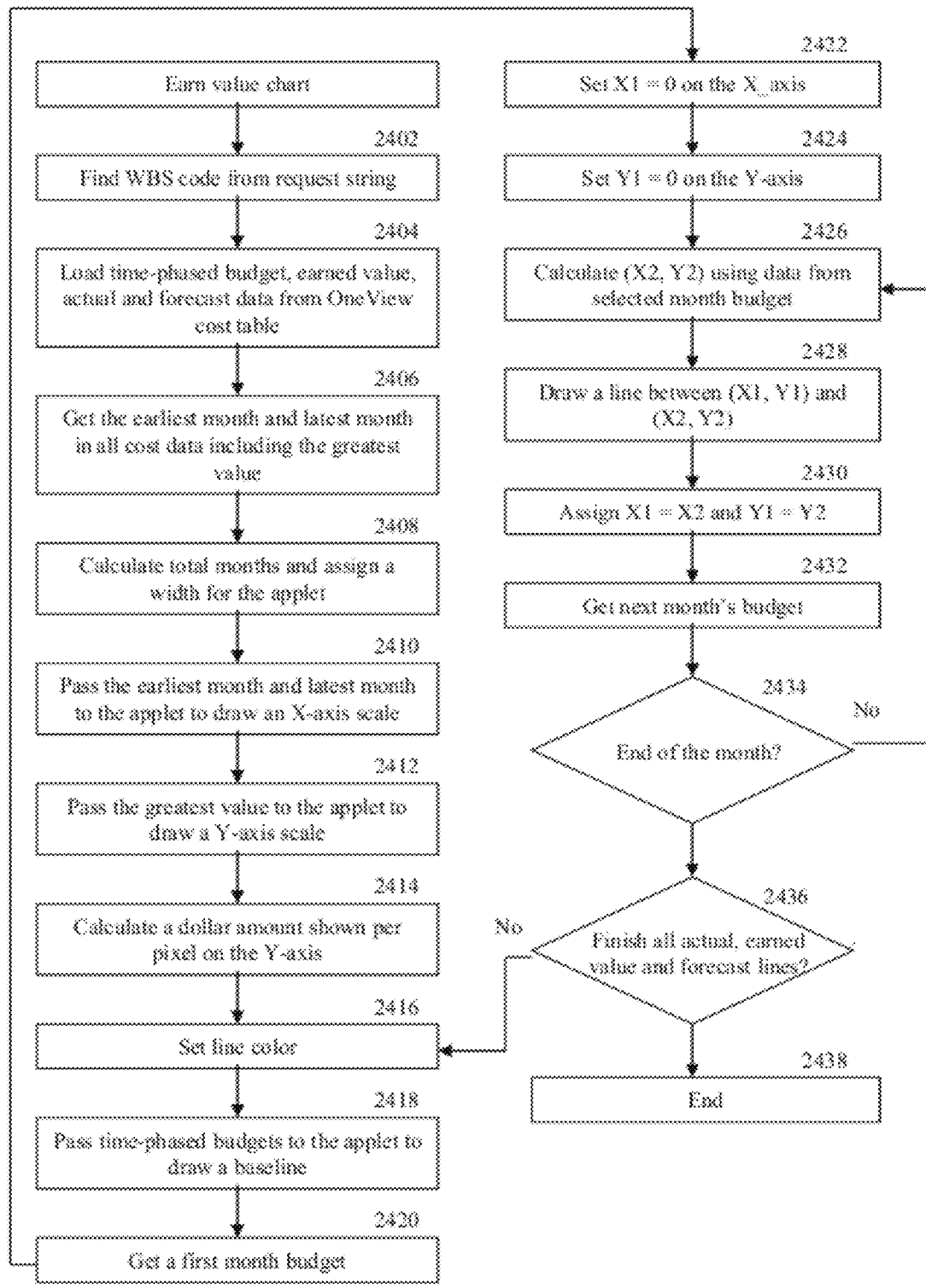
FIG. 24 shows an example of an earned value chart of the present invention.

When a user clicks on the earned value icon 1904, an earned value chart with an earned value 2302 appears as shown by way of an example in FIG. 23. This page displays the movement for baseline budget, earned value, actual, and forecast. The process to load the earned value chart page is shown by way of an example in FIG. 24. The process starts by finding a WBS code from a request string at step 2402. Then, time-phased budget, earned value, actual, and forecast data are loaded from the OneView cost table at step 2404. It would proceed to get the earliest month and latest month in all cost data, also the greatest value in step 2406. Then a calculation will be taken based on information from step 2406, and assign the width for the applet at step 2408. Pass the earliest month and latest month to the applet to draw an X-axis scale at step 2410 and pass the greatest value to the applet to draw a Y-axis scale at step 2412. Calculate the dollar amount shown per pixel on the Y-axis at step 2414. Set line color at step 2416. Pass time-phased budgets to the applet to draw baseline at step 2418. It would proceed to get a first month budget at step 2420. To prepare a display coordinate, set X1=0 on the X-axis at step 2422, Y1=0 on the Y-axis at 2424. To arrange for value displays, calculate (X2, Y2) using data from selected month budget and values from steps 2410 and 2414 at step 2426. Draw a line between (X1, Y1) and (X2, Y2) at step 2428. Assign X1=X2, Y1=Y2 at step 2430. Get the next month budget at step 2432. A determination is made regarding whether an end of the month has been reached at step 2434. If not, then repeat step 2426 to 2434 until the end of the month is reached. Next, a determination is made on whether the process has finished all actual, earned value and forecast lines. If not, then repeat steps 2416 to 2434. The process ends at step 2438.

Figure 25:
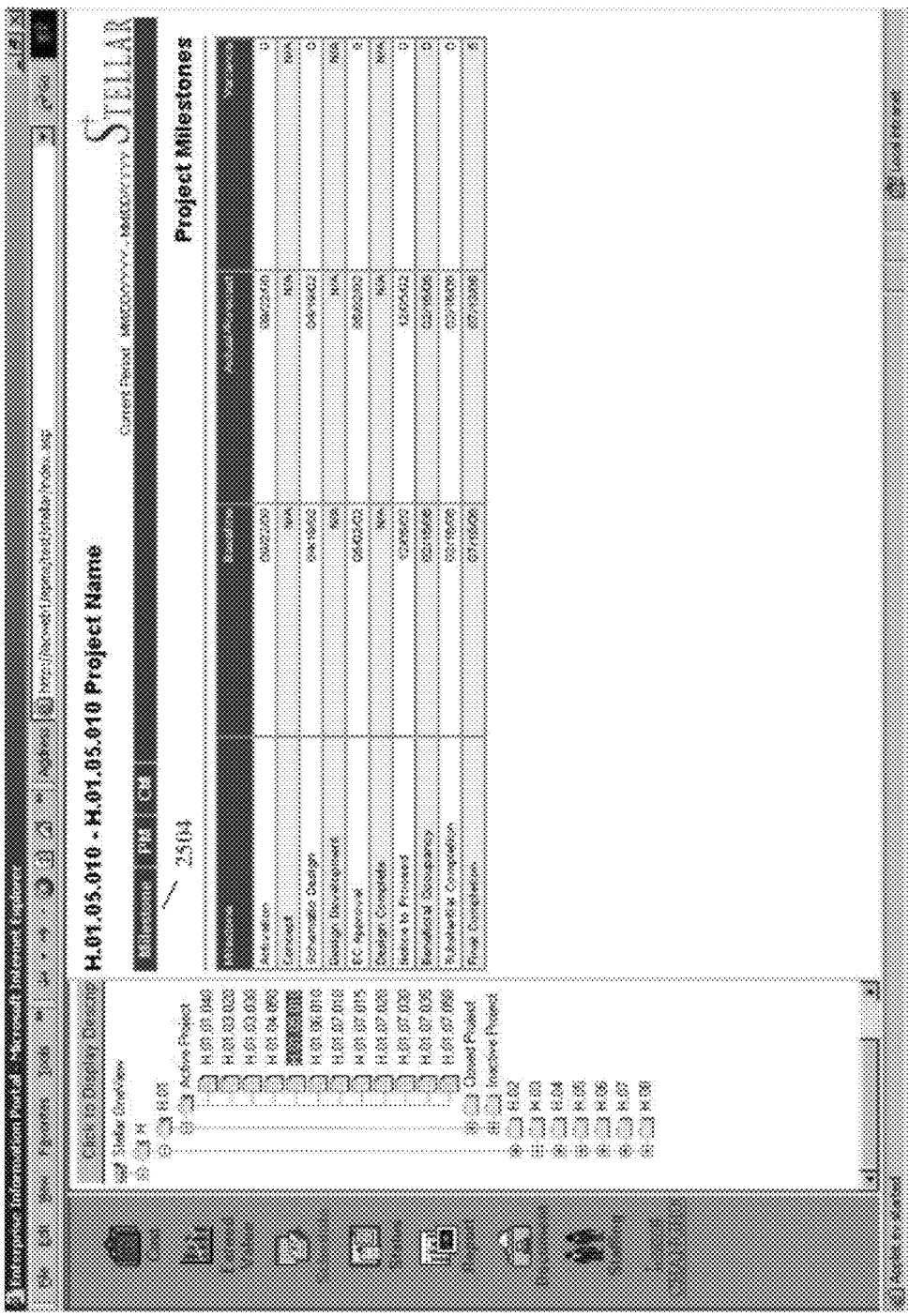
FIG. 25 shows an example of a screen-shot of a schedule information for a hypothetical client of the present invention.
Figure 26:
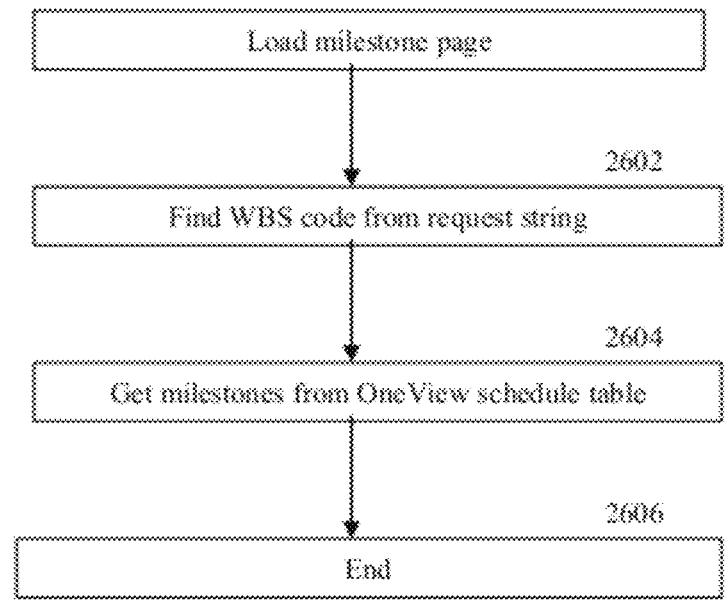
FIG. 26 shows an example of a flow chart controlling a load milestone page of the present invention.

If a user clicks the schedule icon 1906, a project mile stone page with a milestone 2504 is shown by way of an example in FIG. 25. In this example, this page includes life-cycle milestones as well. To load the milestone page, a WBS code needs to be found from a request string at step 2602 of FIG. 26. Follow by getting milestones from the OneView schedule table at step 2604. The process ends at step 2606.

Figure 27:
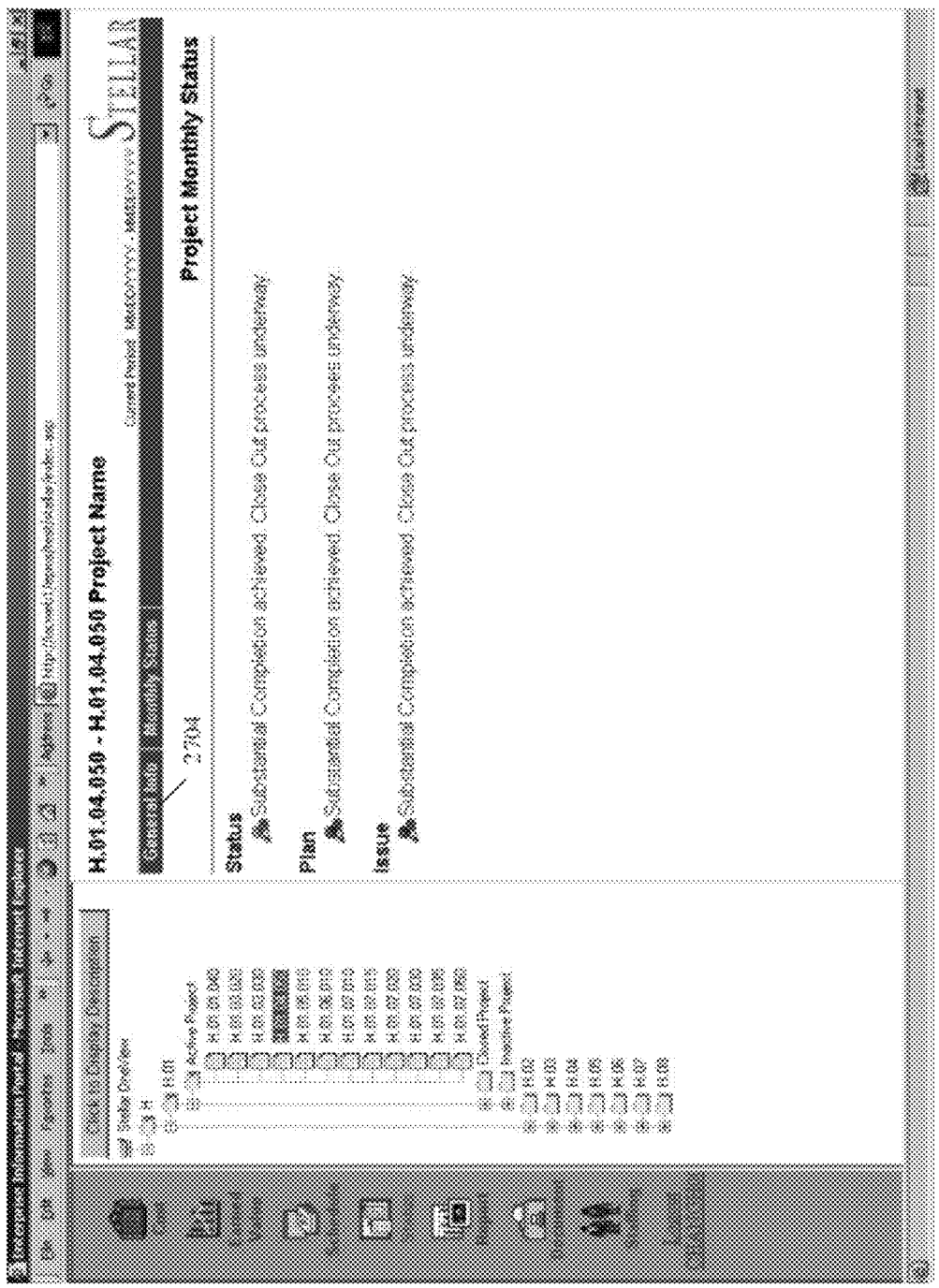
FIG. 27 shows an example of a screen-shot of a status information for a hypothetical client of the present invention.
Figure 28:
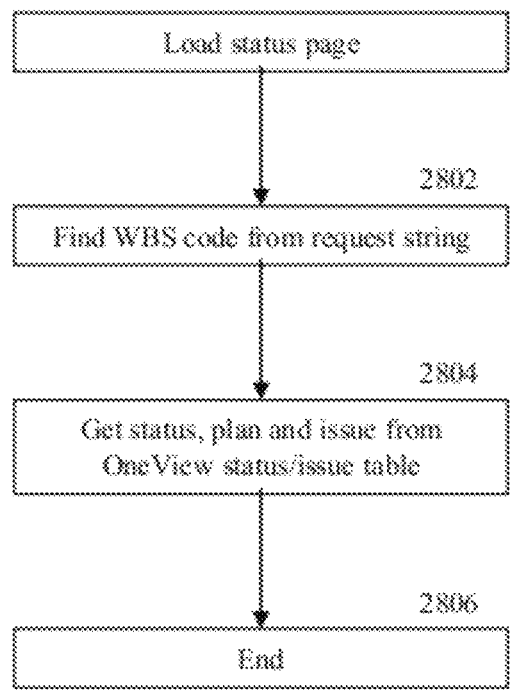
FIG. 28 shows an example of a flow chart controlling a load status page of the present invention.

Should a user click on the status icon 1908, a project status page with general information 2704 and status, plan, and issue as shown by way of an example in FIG. 27 appears on a screen. Here is the algorithm to load status page. The process involved to obtain the load status page is shown in FIG. 28. The process starts by finding a WBS code from a request string at step 2802. Then status, plan and issue are obtained from the OneView status/issue table at step 2804 before the process ends at step 2806.

Figure 29:
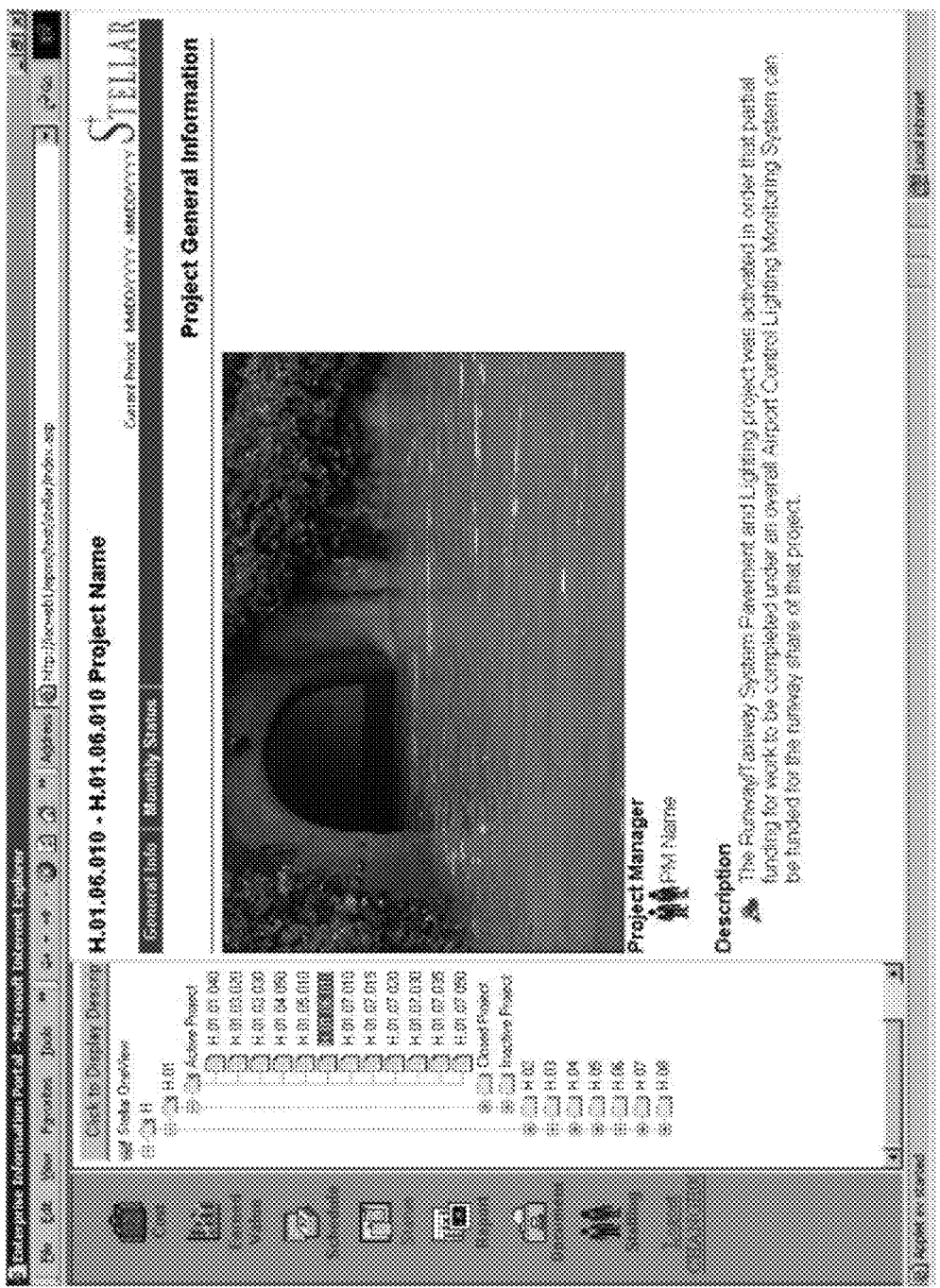
FIG. 29 shows an example of a screen-shot of a status information with description of a project for a hypothetical client of the present invention.
Figure 30:
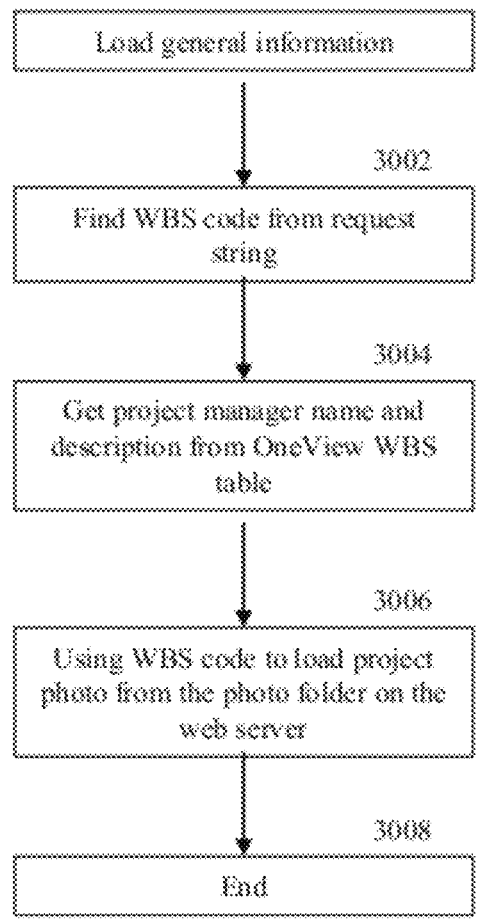
FIG. 30 shows an example of a flow chart to load general information of the present invention.

Under the status page, a user may obtain some project general information, as that shown by way of an example in FIG. 29. This page includes a photo, a project manager name, and a description. The process to load general information page is shown in FIG. 30. The process starts from finding a WBS code from a request string at step 3002. Then get a project manager name and description from the OneView WBS table at step 3004. Next, use a WBS code to load a project photo from a photo folder on the web server at step 3006 before the process ends at step 3008.

Figure 31:
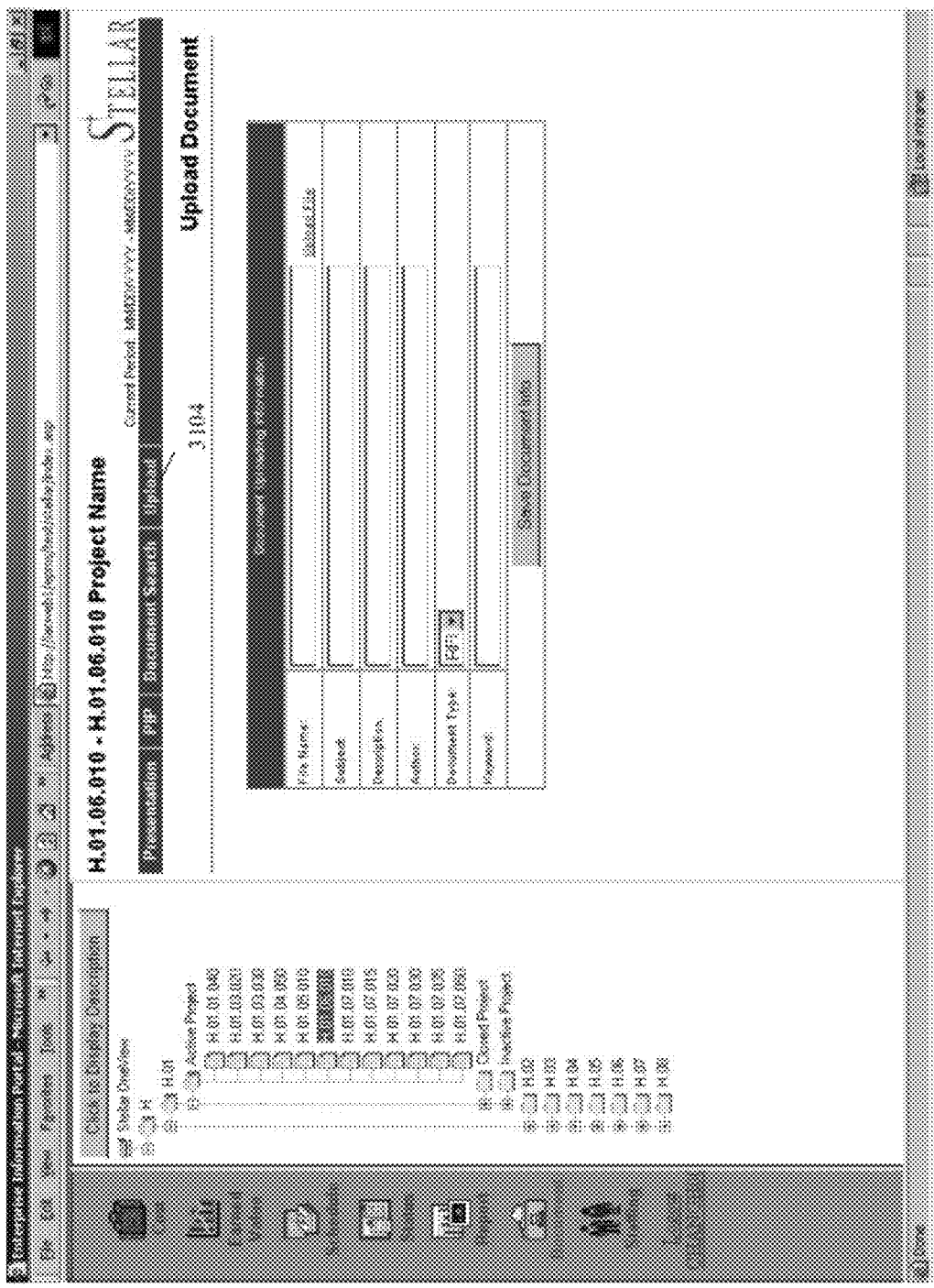
FIG. 31 shows an example of a screen shot regarding document upload information of the present invention.
Figure 32:
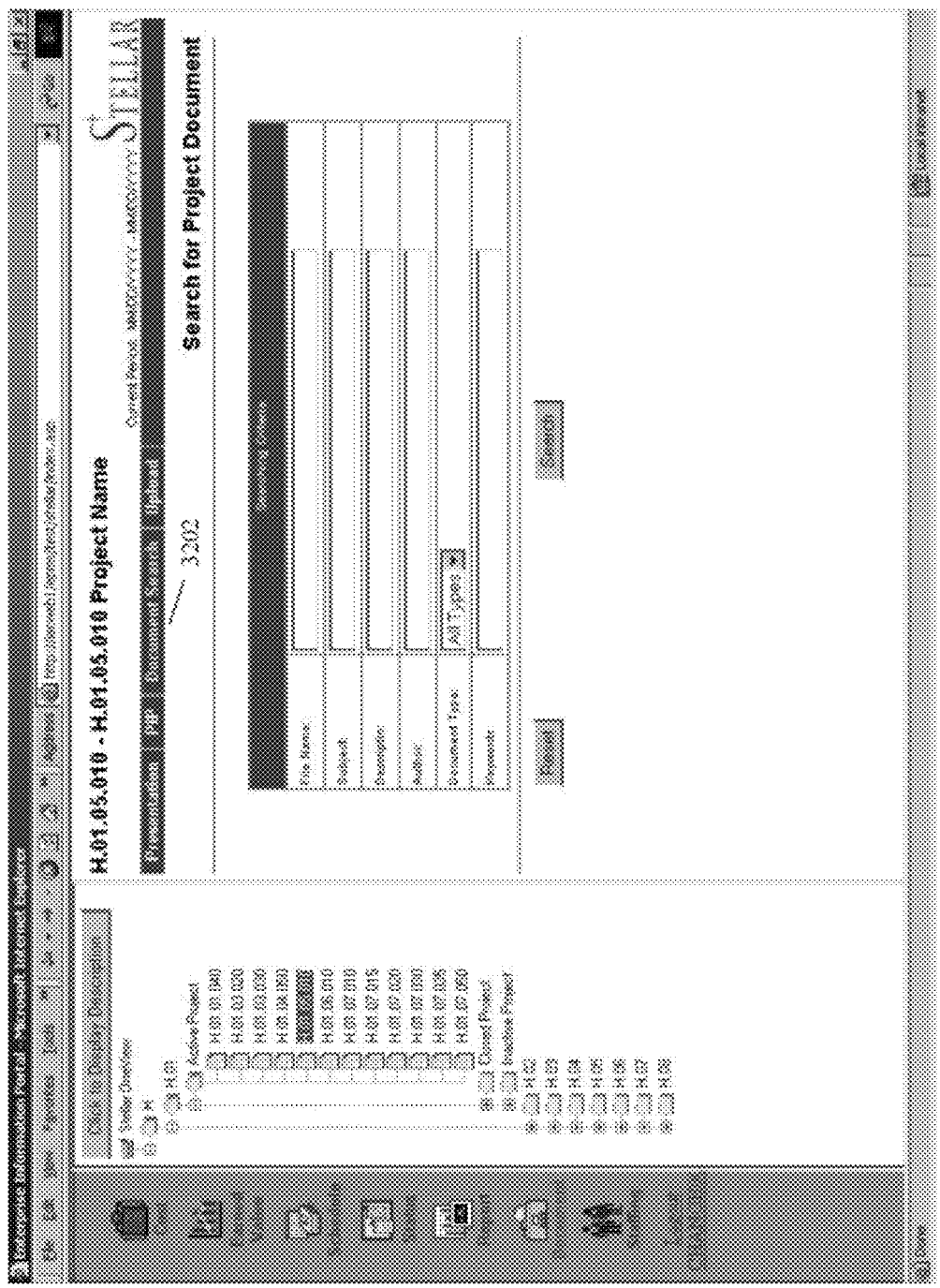
FIG. 32 shows an example of a screen-shot with searching criteria of the present invention.
Figure 33:
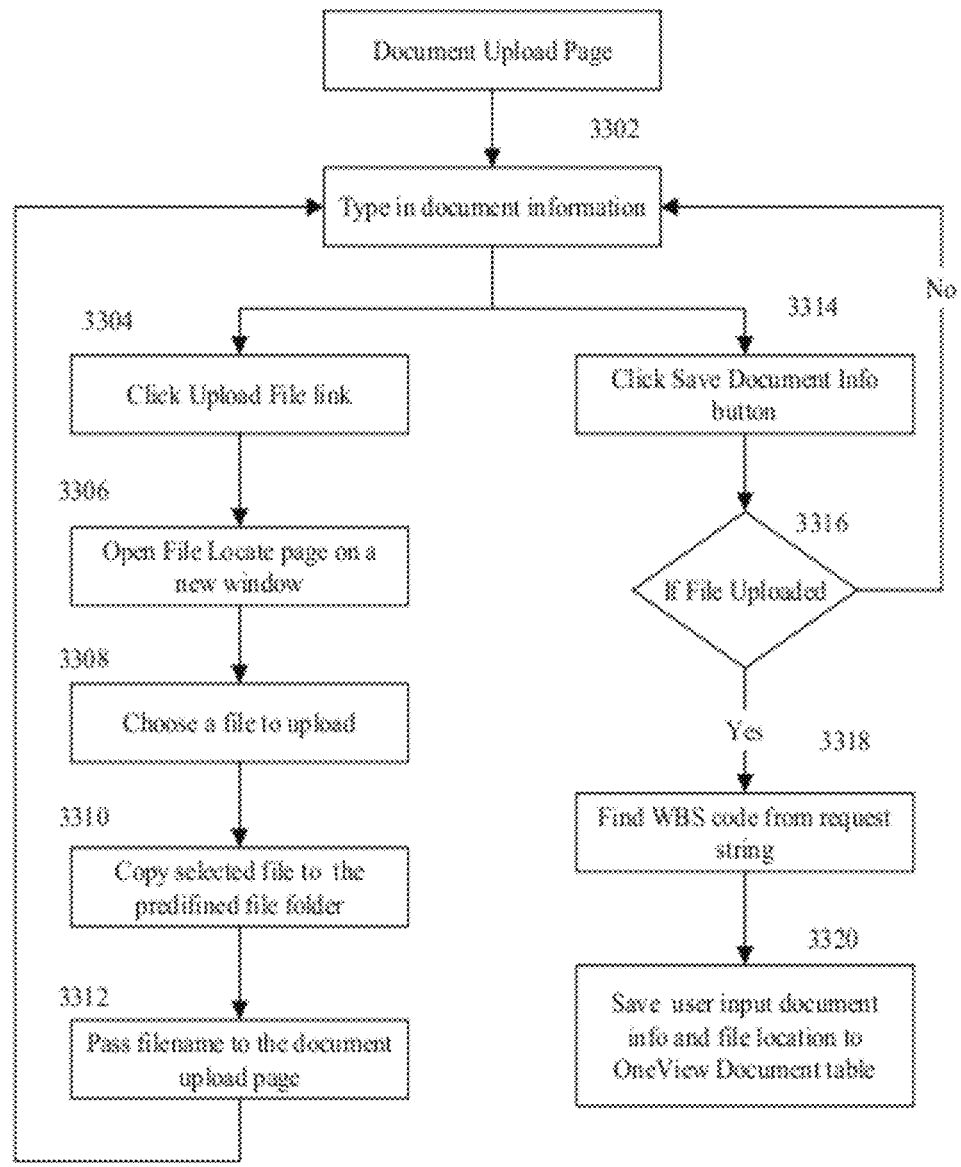
FIG. 33 shows an example of a flow chart of a document upload page of the present invention.

Under the document page, a user may upload a document via upload 3104, as shown by way of an example in FIG. 31; and may also search and view a document via document search 3202, as that shown by way of an example in FIG. 32. The process to upload a document is shown in FIG. 33. After opening a document upload page, a user can type in document information anytime at step 3302. When clicked on the upload file link at step 3304, a new window will popup to allow the user to locate the file to be uploaded at step 3306. A user can choose a file to upload at step 3308. Next is copying the selected file to the predefined file folder at step 3310. After copying is completed, pass filename to the document upload page at step 3312. The user can continue to type-in document information at step 3302. When clicked upon a save document info button at step 3314, there is a check if the file is uploaded at step 3316. If not, go back to allow the user to complete the information at step 3302; or find WBS code from request string at 3318. Then save document information and file location to OneView document table at step 3320.

Figure 34:
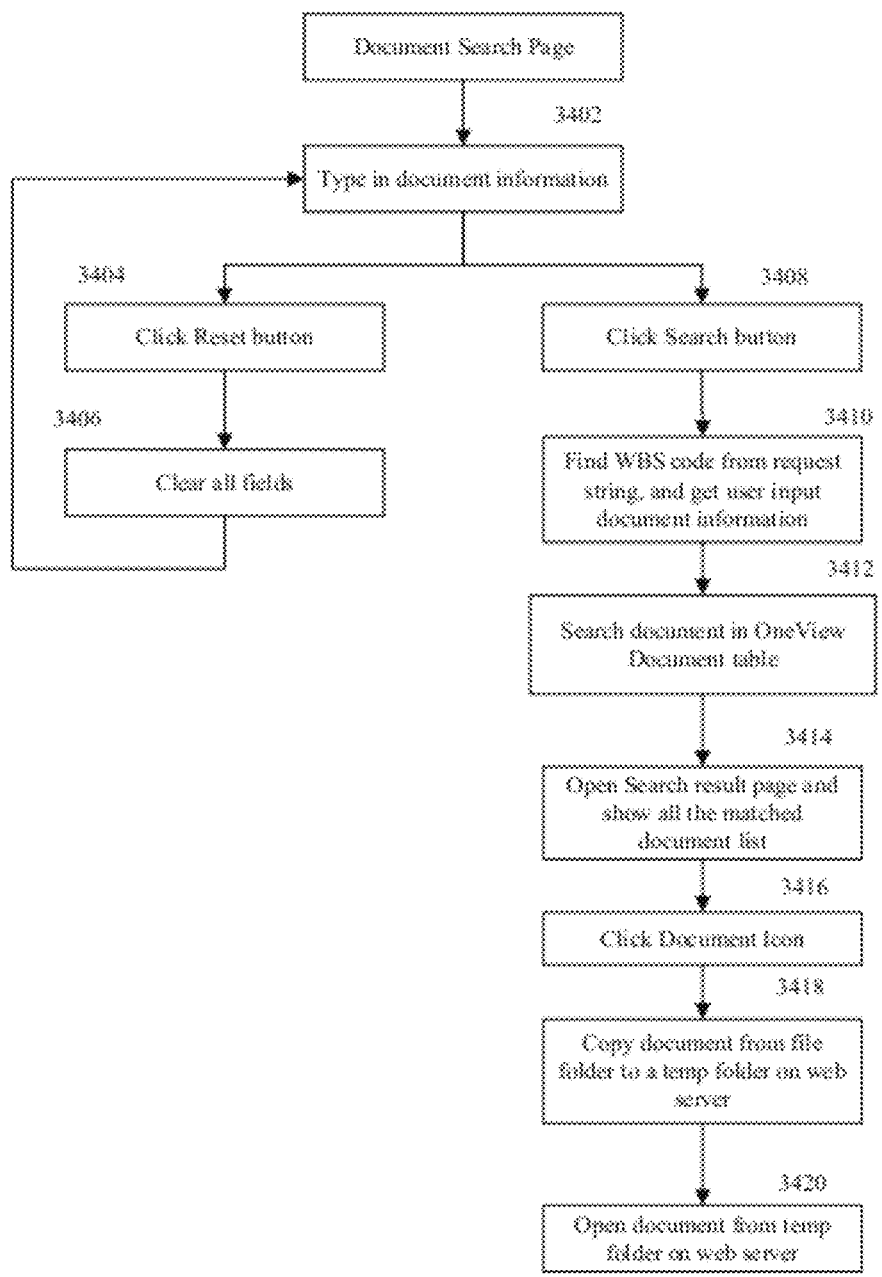
FIG. 34 shows an example of a flow chart of a document searching page of the present invention.
Figure 35:
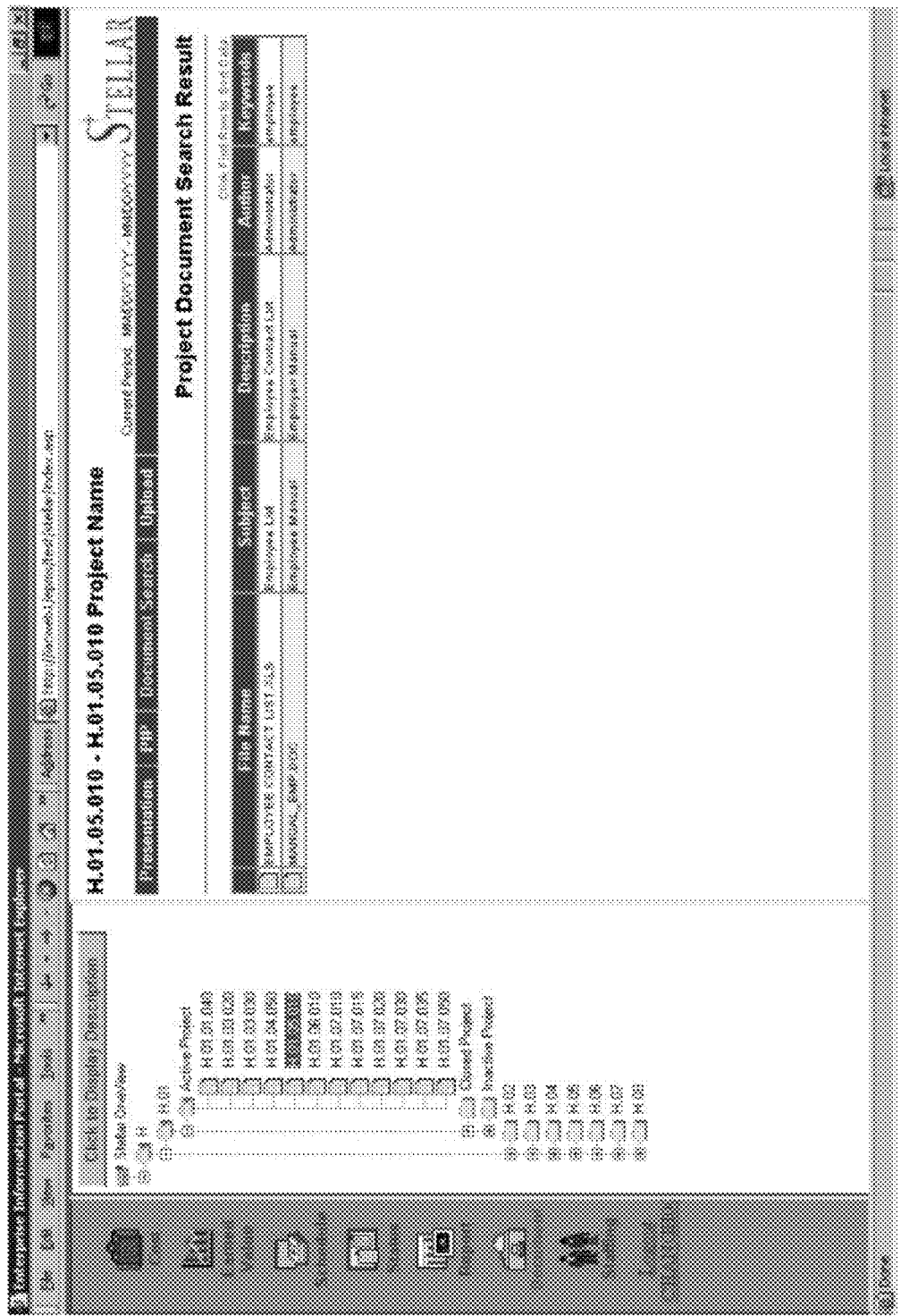
FIG. 35 shows an example of a screen-shot of a project document search result for a hypothetical client of the present invention.

The process to search document is shown in FIG. 34. After opening the document upload page, a user can type-in document information at step 3402. When click on the reset button at step 3404, all fields will be clear at step 3406, and the process returns to waiting for the user to type-in document information at step 3402. When click on Search button at step 3408, there is performed finding a WBS code from a request string and get document information at step 3410. Thereafter, search a document in the OneView document table at step 3412. Next is to open a searching result page to list all matched document list at step 3414, as shown by way of an example in FIG. 35. When click on a document icon at step 3416, there is performed making a copy of the selected document from file folder to a temporary folder on the web server at step 3418. Open the copied document from the temporary folder on the web server at step 3420.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

The invention claimed is:

1. A computer processor implemented method of gathering data from a plurality of sources including a current database and a historical database and organizing the data as an official report for a pre-defined reporting cutoff date to be displayed on a display device under control of a software package and further providing access to said data via a web portal, comprising a processor executing a plurality of steps of:
   a. establishing the pre-defined reporting cutoff date so as to provide a status of a project at a moment in time;
   b. saving data from the current database into the historical database to backup said data for every cutoff period and enable tracing of trends for the project;
   b-1. retrieving raw or processed data from at least two pre-existing software programs of a user-client;
   b-2. storing said raw or processed data into a OneView data warehouse, wherein said OneView data warehouse comprises a plurality of parts including cost, scheduling, funding, and status/issue parts;
   c. providing an update to a work breakdown structure;
   d. updating cost data using the OneView data warehouse;
   e. repeating step d if the cost data update is not completed;
   f. updating scheduling data using the OneView data warehouse;
   g. repeating step f if the scheduling data update is not completed;
   h. updating funding data using the OneView data warehouse;
   i. repeating step h if the funding data update is not completed;
   j. updating status/issue data using the OneView data warehouse;
   k. repeating step j if the status/issue data update is not completed;
   l. generating a preliminary report using the updated cost, scheduling, funding, and status/issue data;
   m. presenting the preliminary report for accuracy;
   n. determining whether any further updates are needed;
   o. repeating from steps c to n if it is determined that further updating are needed;
   p. generating the official report for the pre-defined reporting cutoff date using the respective updated and/or further updated cost, scheduling, funding, and status/issue data;
   q. displaying the official report on the display device, via said web portal, under control of the software package
   r. providing real-time information access to said OneView data warehouse and customized status reports via said web portal, wherein said web portal includes frames including a work breakdown structure (WBS) tree, function tabs, and a report frame and further allows said tracing of trends for said project;

s. receiving selections of said report frame and either a node of said WBS tree or said function tab;

t. generating a status report of said customized status reports based on said selections, said status report;

wherein loading the work breakdown structure tree from a memory, comprising a plurality of steps of:

aa. create a work breakdown structure (WBS) node object including a work breakdown structure code, a description property, and a collection of children WBS nodes;

bb. set a work breakdown structure level to 1.

2. The computer processor implemented method of claim 1, further comprising a step of:

cc. create a root node for the work breakdown structure code on level 1 from an application work breakdown structure table.

3. The computer processor implemented method of claim 2, further comprising a step of:

dd. increment the work breakdown structure level by 1.

4. The computer processor implemented method of claim 3, further comprising a step of:

ee. load a work breakdown structure on the work breakdown structure level the work breakdown structure object from the work breakdown structure table in the memory based on a user privilege.

5. The computer processor implemented method of claim 4, further comprising a step of:

ff. add a newly created work breakdown structure node object to its parents' children collection.

6. The computer processor implemented method of claim 5, further comprising a step of:

gg. determine whether a lowest level of the work breakdown structure is reached.

7. The computer processor implemented method of claim 6, further comprising a step of:

hh. repeat steps from dd to gg if it is determined that the lowest level of the work breakdown structure is not reached.

8. The computer processor implemented method of claim 7, further comprising a step of:

ii. show a work breakdown structure code on the display device from a work breakdown structure cookie.

9. The computer processor implemented method of claim 8, further comprising a step of:

jj. the work breakdown structure records a currently selected code upon clicking of a work breakdown structure tree key.

10. The computer processor implemented method of claim 9, further comprising a step of:

kk. refresh a work breakdown structure tree frame.

* * * * *